US011254391B2

(12) United States Patent
Larson et al.

(10) Patent No.: US 11,254,391 B2
(45) Date of Patent: Feb. 22, 2022

(54) BALLAST SYSTEM FOR A BOAT AND METHOD OF OPERATING A BOAT

(71) Applicant: MasterCraft Boat Company, LLC, Vonore, TN (US)

(72) Inventors: Adam D. Larson, Maryville, TN (US); Michael D. Myers, Knoxville, TN (US); Darren S. Sheedy, Greenback, TN (US); David F. Ekern, Knoxville, TN (US)

(73) Assignee: MasterCraft Boat Company, LLC, Vonore, TN (US)

( * ) Notice: Subject to any disclaimer, the term of this patent is extended or adjusted under 35 U.S.C. 154(b) by 579 days.

(21) Appl. No.: 16/118,581

(22) Filed: Aug. 31, 2018

(65) Prior Publication Data
US 2019/0118907 A1    Apr. 25, 2019

Related U.S. Application Data

(60) Provisional application No. 62/553,318, filed on Sep. 1, 2017.

(51) Int. Cl.
*B63B 13/00* (2006.01)
*B63B 1/18* (2006.01)
*B63B 39/06* (2006.01)

(52) U.S. Cl.
CPC .............. *B63B 13/00* (2013.01); *B63B 1/18* (2013.01); *B63B 39/061* (2013.01)

(58) Field of Classification Search
CPC .......... B63B 13/00; B63B 32/70; B63B 1/18; B63B 1/28; B63B 34/70; B63B 39/061
See application file for complete search history.

(56) References Cited

U.S. PATENT DOCUMENTS

| 339,344 A | 4/1886 | Swan |
|---|---|---|
| 1,339,628 A | 5/1920 | Selah |
| 2,757,629 A | 8/1956 | Wiltse |
| 2,997,974 A | 8/1961 | Hamlin |
| 3,085,535 A | 4/1963 | Hunt |
| 3,195,497 A | 7/1965 | Field |
| 3,503,358 A | 3/1970 | Moesly |

(Continued)

FOREIGN PATENT DOCUMENTS

| GB | 1037338 | 7/1966 |
|---|---|---|
| WO | 83/01426 | 4/1983 |

OTHER PUBLICATIONS

Head, Marty, Wake World, "How to Buy a Wakeboard Boat", Jan. 25, 2017, http://www.wakeworld.com/news/feature/how-to-buy-a-wakeboard-boat.html.

(Continued)

*Primary Examiner* — S. Joseph Morano
*Assistant Examiner* — Jovon E Hayes
(74) *Attorney, Agent, or Firm* — Venable LLP

(57) ABSTRACT

A method of operating a boat to produce a surf wake includes partially filling a transverse ballast tank, moving the boat through a body of water, rolling the boat toward either its port or starboard side to shift the water in the transverse ballast tank such that at least some of the water in the transverse ballast tank moves from one side of a longitudinal centerline of the boat to the other side of the centerline, and creating a surf wake on the side toward which the boat is rolled.

42 Claims, 12 Drawing Sheets

(56) References Cited

U.S. PATENT DOCUMENTS

| | | | |
|---|---|---|---|
| 3,797,437 | A | 3/1974 | Cowles |
| 3,826,212 | A | 7/1974 | Pangalila |
| 4,217,845 | A | 8/1980 | Hood et al. |
| 4,313,390 | A | 2/1982 | Yunoki et al. |
| 4,478,165 | A | 10/1984 | Strain |
| 4,528,927 | A | 7/1985 | Iizuka et al. |
| 4,674,430 | A | 6/1987 | Murata et al. |
| 4,759,307 | A | 7/1988 | Scott |
| 5,163,377 | A | 11/1992 | Calderon et al. |
| 5,215,025 | A | 6/1993 | Talmor |
| 5,645,003 | A | 7/1997 | Grinde |
| 5,787,835 | A * | 8/1998 | Remnant ............... B63B 1/32 114/271 |
| 5,901,656 | A | 5/1999 | Cheung |
| 5,979,350 | A | 11/1999 | Larson et al. |
| 6,105,527 | A * | 8/2000 | Lochtefeld ............. B63B 32/70 114/125 |
| 6,158,375 | A | 12/2000 | Stuart, Jr. |
| 6,234,099 | B1 | 5/2001 | Jessen et al. |
| 6,427,616 | B1 | 8/2002 | Hagen |
| 6,505,572 | B1 | 1/2003 | Seipel et al. |
| 6,523,489 | B2 | 2/2003 | Simard et al. |
| 6,953,002 | B2 | 10/2005 | Jessen et al. |
| 7,240,631 | B1 * | 7/2007 | Al-Babtain ............. B63B 11/04 114/125 |
| 7,677,190 | B2 | 3/2010 | Miller |
| 7,849,809 | B2 | 12/2010 | Gale |
| 7,856,937 | B2 | 12/2010 | Chapdelaine et al. |
| 8,336,477 | B2 | 12/2012 | Walker |
| 8,578,873 | B2 | 11/2013 | Gasper et al. |
| 8,590,475 | B2 | 11/2013 | Viviani et al. |
| 8,739,723 | B1 * | 6/2014 | Murphy ................. B63B 32/70 114/125 |
| 8,857,364 | B2 | 10/2014 | Viviani et al. |
| 9,038,554 | B2 | 5/2015 | De Troz |
| 9,150,291 | B2 * | 10/2015 | Dollar ................... B63B 32/70 |
| 9,180,932 | B2 | 11/2015 | Murphy |
| 9,238,499 | B1 * | 1/2016 | Viviani ................. B63H 21/32 |
| 9,254,896 | B2 * | 2/2016 | Bertalan ................ B63B 39/00 |
| 9,643,697 | B2 * | 5/2017 | Sheedy .................. B63B 1/20 |
| 9,694,873 | B2 | 7/2017 | Gasper et al. |
| 2004/0139899 | A1 * | 7/2004 | Scott ..................... B63B 39/03 114/125 |
| 2015/0175242 | A1 * | 6/2015 | Sheedy .................. B63B 32/70 114/285 |
| 2016/0214681 | A1 * | 7/2016 | Huyge .................... B63B 1/32 |
| 2017/0029072 | A1 | 2/2017 | Gasper et al. |
| 2017/0038771 | A1 * | 2/2017 | Green ................... G05D 1/0016 |
| 2017/0240263 | A1 * | 8/2017 | Kanazawa .............. B63J 4/002 |
| 2017/0349247 | A1 * | 12/2017 | Herrington ........... B63H 25/38 |
| 2019/0118907 | A1 * | 4/2019 | Larson .................. B63B 32/70 |

OTHER PUBLICATIONS

Wakeboarding, "Pavati AL-24 Wakesurf Review," Feb. 17, 2016, http://www.wakeboardingmag.com/surf-pavati-al-24.
Planet Nautique "Ballast Shift Option on 2016 G-Series Boats," Oct. 17, 2015, https://www.planetnautique.com/vbd/forum/nautique-topics/general-nautique-discussion/474390-ballast-shift-option-on-2016-g-series-boats.
Wakemakers, "Ballast Guide: Weighting Your Boat for Wakesurfing", 2017, https://www.wakemakers.com/resources/how-to-weight-your-boat-for-wakesurfing/.
Offshore Sailor "Water ballast," Jun. 17, 2016, http://www.offshore-sailor.com/articles/design-and-construction/water-ballast/.
Performance Wakeboard Report, 1997, vol. 1, Issue 1, pp. cover, 22.
Performance Wakeboard Report, Ultimate Gear, 1997, vol. 1, Issue 3, pp. cover, 27.
Powerboat Magazine, Apr. 1997. pp. cover, 48-51.
Fineline Industries, Inc., "Huge Wake Zone Waves Only," brochure. Wake Boarding, May 1997 (3 pages).
10 Photos of Fineline Wave.
International Search Report and Written Opinion dated Nov. 15, 2018, in International Application No. PCT/US2018/049024.

* cited by examiner

BALLAST SYSTEM FOR A BOAT AND METHOD OF OPERATING A BOAT

CROSS-REFERENCE TO RELATED APPLICATION

This application claims the benefit under 35 U.S.C. § 119(e) of U.S. Provisional Patent Application No. 62/553,318, filed Sep. 1, 2017, and titled "Ballast Tank for a Boat and Method of Operating a Boat to Produce a Surf Wake." The foregoing application is hereby incorporated by reference in its entirety and made a part of this specification for all it discloses.

FIELD OF THE INVENTION

This invention relates ballast systems in recreational boats and methods of using the same for water sports, especially wake surfing.

BACKGROUND OF THE INVENTION

Recreational sport boats are often used to tow water sports participants such as water skiers, wakeboarders, wake surfers, and the like. The optimal wake depends on which of these water sports a boat is used for, as well as the preferences and skill level of the participant. Wake surfers generally prefer a large wake that is shaped similarly to ocean waves. To make such wakes with recreational sport boats, large amounts of ballast have been asymmetrically loaded on one side of the boat (typically in the aft corner) to heel the boat to one side and create a wake desirable for surfing on that side of the boat. This approach is often slow and cumbersome, particularly when water was used as the ballast. It takes several minutes to fill ballast tanks and, once filled, the boat is heeled to one side even when the boat is at rest. The trend in recent years has been to load boats evenly with ballast and deploy a mechanical surf device to create a wake for surfing. Examples of such surf devices are disclosed in U.S. Pat. No. 8,833,286.

SUMMARY OF THE INVENTION

In one aspect, the invention relates to a method of operating a boat to produce a surf wake. The method includes supplying water to a transverse ballast tank to partially fill the transverse ballast tank. The transverse ballast tank is oriented transversely in the boat, and preferably is positioned aft of a control console for operating the boat. The method also includes moving the boat through a body of water and rolling the boat toward either its port or starboard side to shift the water in the transverse ballast tank such that at least some of the water in the transverse ballast tank moves from one side of a longitudinal centerline of the boat to the other side of the centerline. The method further includes creating a surf wake on the side toward which the boat is rolled.

In another aspect, the invention relates to a method of operating a boat to produce a surf wake. The method includes adding water to a transverse ballast tank. The transverse ballast tank is oriented transversely in the boat, and preferably is positioned aft of a control console for operating the boat. The method also includes removing some of the water from the transverse ballast tank such that the transverse ballast tank is partially filled. The method further includes moving the boat through a body of water and rolling the boat toward either its port or starboard side to shift the water in the transverse ballast tank such that at least some of the water in the transverse ballast tank moves from one side of a longitudinal centerline of the boat to the other side of the centerline. The method still further includes creating a surf wake on the side toward which the boat is rolled.

In a further aspect, the invention relates to a boat. The boat includes a hull, a control console for operating the boat, a transverse ballast tank, a ballast fill mechanism, a pair of trim devices, a plurality of actuators, an input device, and a controller. The hull includes a bow, a transom, and port and starboard sides. The transverse ballast tank is oriented transversely in the boat, and preferably is located aft of the control console. The ballast fill mechanism is fluidly connected to the transverse ballast tank to supply water to the transverse ballast tank. The pair of trim devices is attached to the aft half of the hull. A first one of the trim devices is positioned on a port side of a longitudinal centerline of the boat, and a second one of the trim devices is positioned on a starboard side of the boat's longitudinal centerline. Each of the trim devices is moveable between a deployed position and a non-deployed position. The plurality of actuators includes a first actuator configured to move the first trim device between its deployed position and its non-deployed position and a second actuator configured to move the second trim device between its deployed position and its non-deployed position. The input device includes a plurality of user-selectable options. One of the user-selectable options is a right-side surf wake, and another of the user-selectable options is a left-side surf wake. The controller is responsive to the input device and is configured to, when one of the user-selectable options is selected, operate the ballast fill mechanism to adjust the level of water in the transverse ballast tank such that it is partially filled and control at least one of the first actuator and second actuator. The controller controls the first actuator to move the first wake-modifying device to its deployed position when the right-side surf wake option is selected. The controller controls the second actuator to move the second wake-modifying device to its deployed position when the left-side surf wake option is selected.

In still another aspect, the invention relates to a boat. The boat includes a hull, a control console for operating the boat, and a transverse ballast tank. The hull includes a bow, a transom, and port and starboard sides. The transverse ballast tank is oriented transversely in the boat, and preferably is located aft of the control console. The transverse ballast tank includes a port-side portion located on the port side of a longitudinal centerline of the boat, a starboard-side portion located on the starboard side of the boat's longitudinal centerline, and a center portion connecting the port-side portion to the starboard-side portion such that water in the transverse ballast tank can flow between the port-side portion and the starboard-side portion. A flow passage from the center portion to the port-side portion is located in the bottom half of the port-side portion, and a flow passage from the center portion to the starboard-side portion is located in the bottom half of the starboard-side portion.

In these aspects, the transverse ballast tank is oriented transversely in the boat. The transverse ballast tank preferably extends across the longitudinal centerline of the boat such that a portion of the transverse ballast tank is on the port side of the longitudinal centerline and a portion of the ballast tank is on the starboard side of the longitudinal centerline. Although the transverse ballast tank preferably may have a width spanning from a position proximate the port side of the hull to a position proximate the starboard side of the hull, it is not so limited and can have shorter width. In addition, the transverse ballast tank need not be configured and oriented such that it is perpendicular to the boat's longitudinal centerline; instead it may have other configurations and orientations such that it intersects the boat's longitudinal centerline at an oblique angle.

In yet another aspect, the invention relates to a method of operating a boat to produce a surf wake. The method includes supplying water to a port-side ballast tank to partially fill the port-side ballast tank. The port-side ballast tank is located on the port side of a longitudinal centerline of the boat, preferably aft of a control console for operating for the boat. The method also includes supplying water to a starboard-side ballast tank to partially fill the starboard-side ballast tank. The starboard-side ballast tank is located on the starboard side of the boat's longitudinal centerline, preferably aft of the control console. The method further includes moving the boat through a body of water and shifting at least a portion of the water in one of the port-side ballast tank and the starboard-side ballast tank to the other one of the port-side ballast tank and the starboard-side ballast tank. When water is shifted to the port-side ballast tank from the starboard-side ballast tank, a surf wake is created on the port side of the boat, and when water is shifted to the starboard-side ballast tank from the port-side ballast tank, a surf wake is created on the port side of the boat.

In still a further aspect, the invention relates to a method of operating a boat to produce a surf wake. The method includes adding water to a port-side ballast tank. The port-side ballast tank is on the port side of a longitudinal centerline of the boat, preferably aft of a control console for operating for the boat. The method also includes removing some of the water from the port-side ballast tank such that the port-side ballast tank is partially filled. The method further includes adding water to a starboard-side ballast tank. The starboard-side ballast tank is on the starboard side of the boat's longitudinal centerline, preferably aft of the control console. The method still further includes removing some of the water from the starboard-side ballast tank such that the starboard-side ballast tank is partially filled. The method yet further includes moving the boat through a body of water and shifting at least a portion of the water in one of the port-side ballast tank and the starboard-side ballast tank to the other one of the port-side ballast tank and the starboard-side ballast tank. When water is shifted to the port-side ballast tank from the starboard-side ballast tank, a surf wake is created on the port side of the boat, and when water is shifted to the starboard-side ballast tank from the port-side ballast tank, a surf wake is created on the port side of the boat.

In yet a further aspect, the invention relates to a boat. The boat includes a hull, a control console for operating the boat, a port-side ballast tank, a starboard-ballast tank, one or more ballast fill mechanisms, a ballast transfer pump, a speed sensing device, an input device, and a controller. The hull includes a bow, a transom, and port and starboard sides. The port-side ballast tank is located on the port side of a longitudinal centerline of the boat, preferably aft of the control console. The starboard-side ballast tank is located on the starboard side of the boat's longitudinal centerline, preferably aft of the control console, and the starboard-side ballast tank is in fluid communication with the port-side ballast tank. The one or more ballast fill mechanisms are configured to supply water to each of the port-side ballast tank and the starboard-side ballast tank. The ballast transfer pump is configured to transfer water between the port-side ballast tank and the starboard-side ballast tank. The speed sensing device is configured to determine the speed of the boat. The input device includes a plurality of user-selectable options. One of the user-selectable options is a right-side surf wake, and another of the user-selectable options is a left-side surf wake. The controller is responsive to the input device and configured to, when one of the user-selectable options is selected operate the one or more ballast fill mechanisms to adjust the level of water in the port-side ballast tank and the starboard-side ballast tank such that they are each partially filled, receive the speed of the boat from the speed sensing device, determine by the speed of the boat received whether the boat is moving through the water, and operate the ballast transfer pump to transfer at least some of the water from one of the port-side ballast tank and the starboard-side ballast tank to the other of the port-side ballast tank and the starboard-side ballast tank while the boat is moving through the water. When the right-side surf wake option is selected, the controller operates to transfer water from the port-side ballast tank to the starboard-side ballast tank, and when the left-side surf wake option is selected, the controller operates to transfer water the starboard-side ballast tank to the port-side ballast tank.

These and other aspects of the invention will become apparent from the following disclosure.

DETAILED DESCRIPTION OF THE PREFERRED EMBODIMENTS

Figure 1:
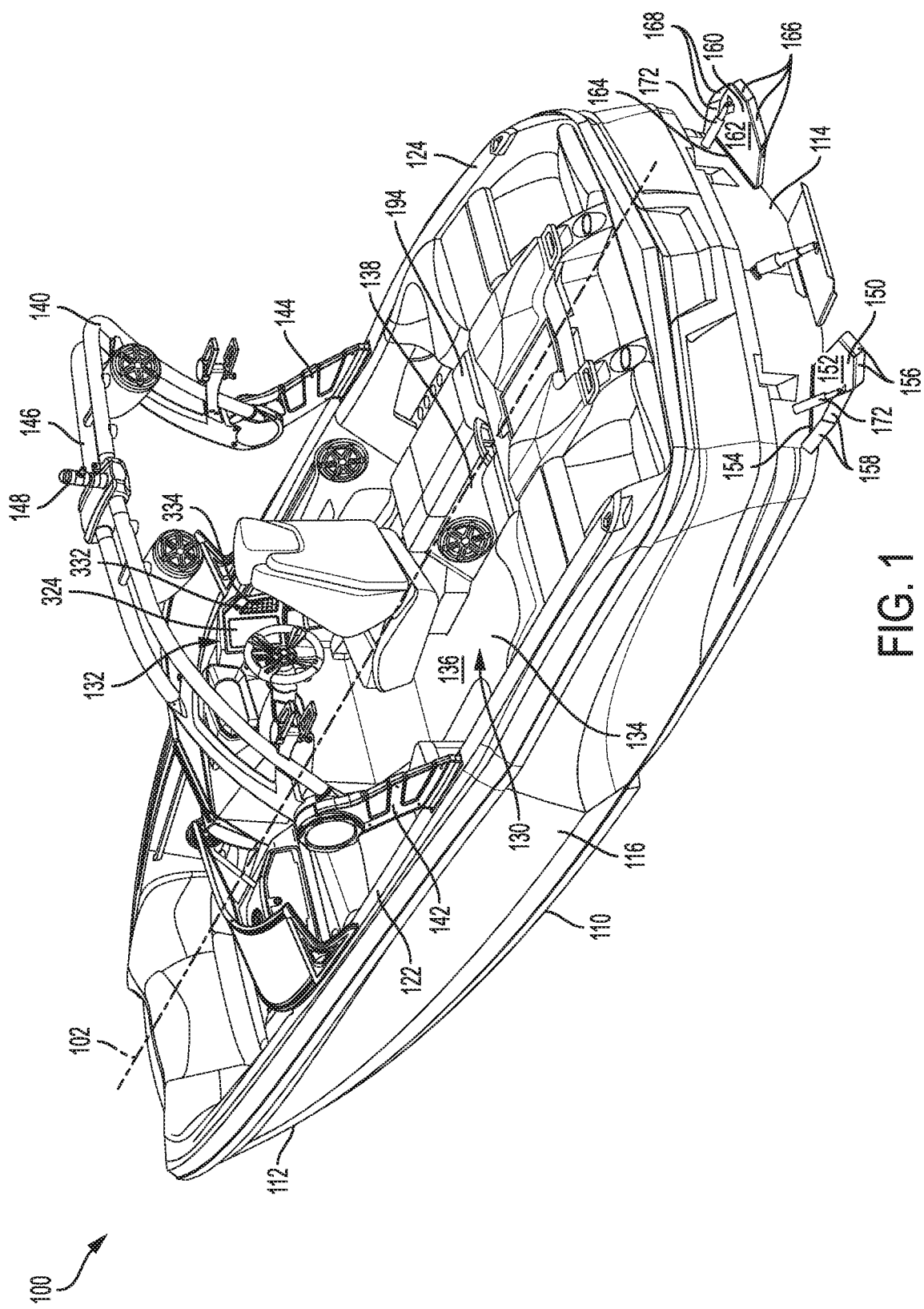
FIG. 1 shows a boat according to a preferred embodiment of the invention.

This invention relates to recreational boats used for wake sports such as wake surfing. Embodiments of this invention will be described in detail below with reference to the accompanying figures. Throughout the specification and accompanying drawings, the same reference numerals will be used to refer to the same or similar components or features. As used herein, directional terms forward (fore), aft, inboard, and outboard have their commonly understood meaning in the art. Relative to the boat, forward is a direction toward the bow, and aft is a direction toward the stern. Likewise, inboard is a lateral direction toward the longitudinal centerline of the boat and outboard is a lateral direction away from it.

Figure 2:
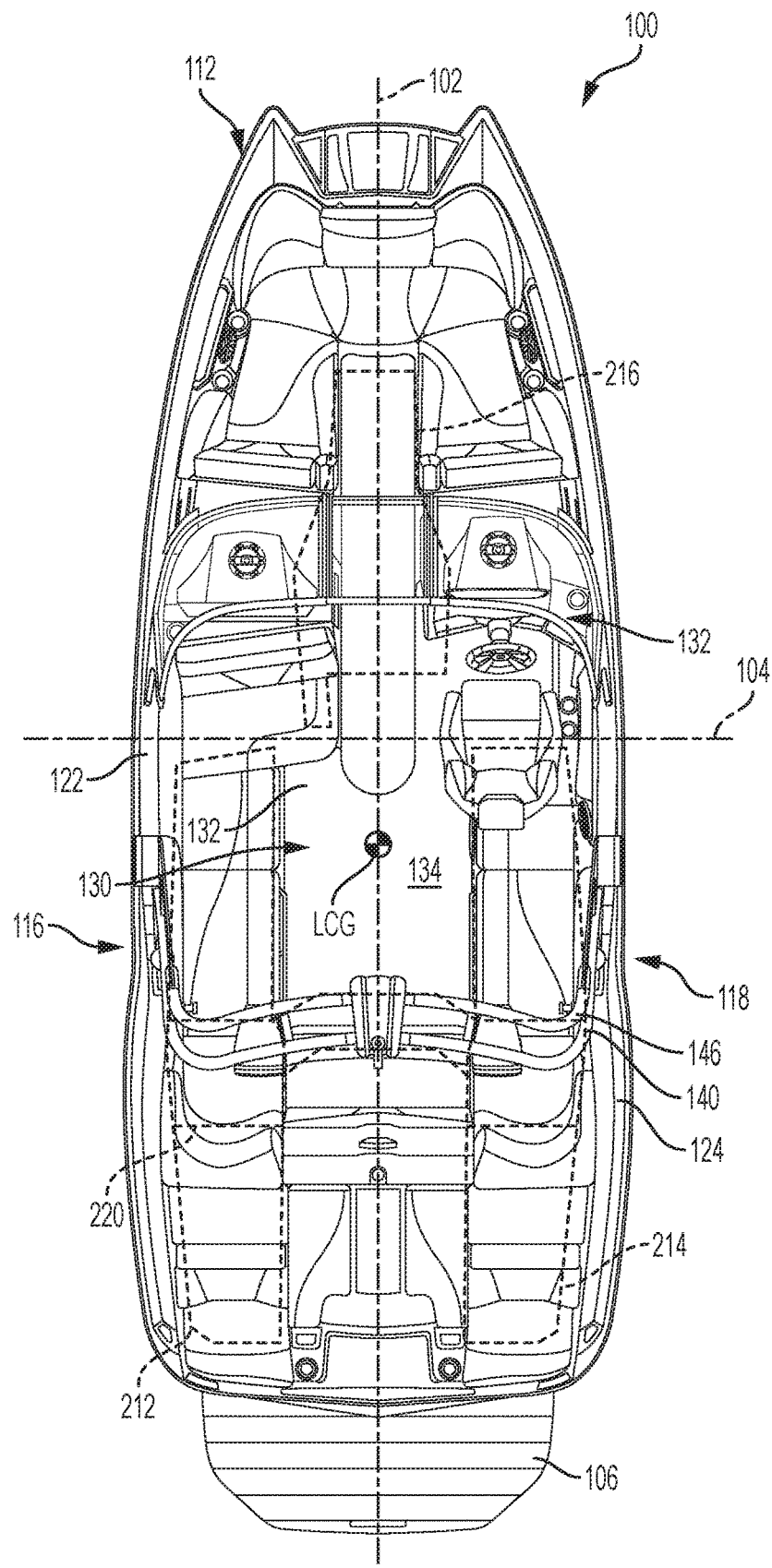
FIG. 2 is a top view of the boat shown in FIG. 1.

FIGS. 1 and 2 show a boat 100 in accordance with an exemplary preferred embodiment of the invention. FIG. 1 is a perspective view of the boat 100, and FIG. 2 is a top plan view of the boat 100. The boat 100 includes a hull 110 with a bow 112, a transom 114, a port side 116, and a starboard side 118. The port and starboard sides 116, 118 have port and starboard gunwales 122, 124, respectively. The boat 100 has a longitudinal centerline 102 running down the middle of the boat 100, halfway between the port and starboard sides 116, 118. Collectively, the bow 112, the transom 114, and the port and starboard sides 116, 118 define an interior 130 of the boat 100. The boat 100 is driven by a single inboard motor (engine 342 in FIG. 4A) connected to a propeller (not shown) by a drive shaft (not shown). However, this invention can be utilized with other types of boats and propulsion systems, including but not limited to outboard motors, sterndrives, and the like.

Within the boat's interior 130 is a control console 132 for operating the boat 100. In this embodiment, the control console 132 is positioned on the starboard side of the boat 100 in the forward half of the boat 100. The boat 100 can be divided into a forward half and an aft half. The forward half is the portion of the boat forward of what will be referred to herein as an amidships centerline 104, and the aft half is the portion of the boat aft of the amidships centerline 104. The amidships centerline 104 is perpendicular to the longitudinal centerline 102 of the boat 100 and located halfway between the forward-most portion of the hull 110 and the aft-most portion of the hull 110. As shown in FIG. 2, for example, the amidships centerline 104 is located halfway between the forward-most portion of the bow 112 and the aft-most portion of the transom 114 and excludes the swim platform 106. The boat 100 has a deck 134 which includes a floor 136. The deck 134 also includes elevated portions, such as seat support structures 138 on which passenger seating may be provided. As used herein, these elevated portions are elevated with respect to the level of the floor 136.

The boat 100 of this embodiment is used for recreational watersports and includes a horizontal swim platform 106 attached to the transom 114 to make it easier for people to get into the water from the boat 100 or into the boat 100 from the water. A top view of the swim platform 106 is shown in FIG. 2, but the swim platform is omitted from FIG. 1 for clarity. The swim platform 106 should be capable of supporting a human and is preferably capable of supporting at least 500 lbs., and even more preferably 1250 lbs. The swim platform 106 may be constructed from any suitable material that may be used in a marine environment including, for example, fiberglass or teak. In this embodiment, the swim platform 106 is attached to the transom 114 of the boat 100 using two brackets screwed to the transom 114; however, the swim platform 106 may be attached to the transom 114 by any suitable means. While the swim platform 106 is described as an attachable/detachable platform, it is not so limited. For example, the swim platform 106 may be integrally formed with the stern of the boat 100.

The boat 100 is also equipped with an apparatus for towing a water sports participant. As shown in FIGS. 1 and 2, the towing apparatus is a tower 140 that is may be used for towing a wakeboarder or wake surfer. Any suitable tower 140 may be used including, for example, those described in U.S. Pat. No. 9,580,155 and U.S. Patent Application Publication No. 2017/0369134, which are incorporated by reference herein in their entireties. The tower 140 includes two legs: a port leg 142 and a starboard leg 144. The port leg 142 is attached on the port side of the longitudinal centerline 102 of the boat 100, and the starboard leg 144 is attached on the starboard side of the longitudinal centerline 102 of the boat 100. Preferably, the port and starboard legs 142, 144 are attached to the port gunwale 122 and to the starboard gunwale 124, respectively. The tower 140 also includes a header 146. The header 146 is connected to an upper portion of each of the two legs 142, 144 and spans the interior 130 of the boat 100 at a height suitable for passengers to pass underneath while standing. In addition, the tower 140 has a tow-line-attachment structure 148 at an upper portion of the tower 140 (the header 146 in this embodiment). This tow-line-attachment structure 148 may be used to connect a tow-line suitable for towing a water sports participant, such as a wakeboarder or wake surfer. Any suitable tow-line-attachment structure may be used, including but not limited to the integrated light and tow-line-attachment assembly disclosed in U.S. Pat. No. 6,539,886, which is incorporated by reference herein in its entirety.

Figure 3:
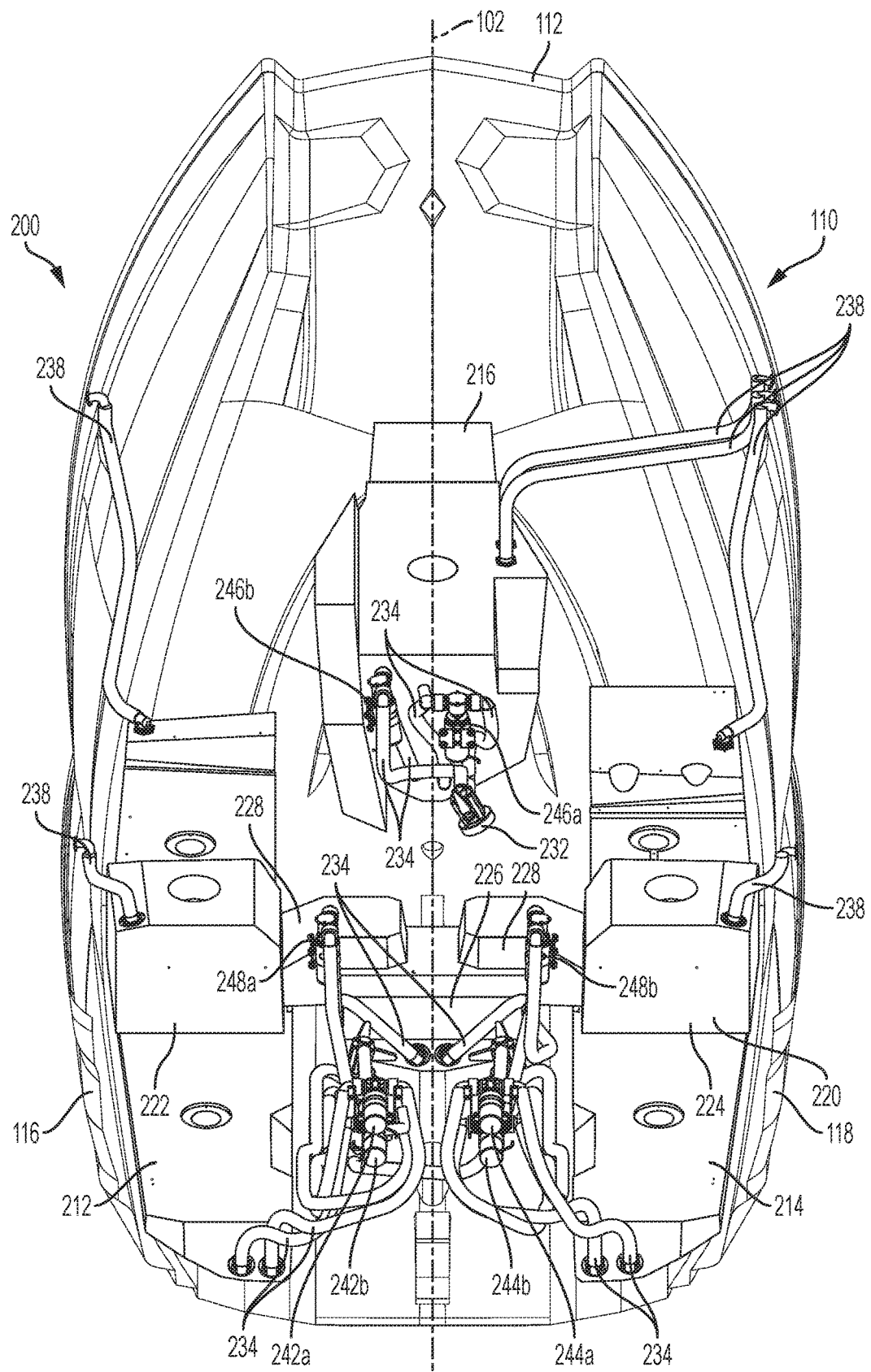
FIG. 3 is a perspective view of the boat shown in FIG. 1 with the deck and transom removed to show the ballast system.

The boat 100 also includes a ballast system 200, which is used to increase the displacement of the boat 100 for water sports such as wakeboarding and wake surfing. FIG. 3 is a perspective view of the boat 100 with the deck 134 and transom 114 removed to show the ballast system 200. The ballast system 200 of this embodiment includes four ballast tanks 210, a port ballast tank 212, a starboard ballast tank 214, a center ballast tank 216, and a transverse ballast tank 220. The ballast tanks 210 are also shown in FIG. 2 with hidden lines. Water from the body of water in which the boat 100 sits may be added to each of the ballast tanks 210 to increase the displacement of the boat 100.

The port ballast tank 212 is located on the port side of the longitudinal centerline 102, and the starboard ballast tank 214 is located on the starboard side of the longitudinal centerline 102. In this embodiment, the boat 100 has two longitudinal stringers (not shown) that divide the maximum beam width of the boat 100 into thirds. The port and starboard ballast tanks 212, 214 are located on the outboard side of the longitudinal stringers between one of the longitudinal stringers and the port side 116 and starboard side 118 of the hull 110, respectively. Thus, the port and starboard ballast tanks 212, 214 are located on opposite outboard thirds of the boat. Each of the port and starboard ballast tanks 212, 214 is located in a cavity formed between the deck 134 and the hull 110 and, in this embodiment, is located at a level lower than the floor 136 of the deck 134. Other suitable configurations may be used, including, for example, ballast tanks that extend upward above the level of the floor 136 in the sides of the hull beneath the gunwales 122, 124.

Preferably, the weight added by filling the port and starboard ballast tanks 212, 214 is applied to an aft portion of the boat 100. By adding the weight to the aft portion of the boat 100, the water not only increases the displacement of the boat 100, but also changes the pitch of the boat 100. The combination of increased displacement and pitch change contribute to creating a larger wake than without the added ballast. The pitch of the boat 100 is more bow up with the additional ballast than without. The boat 100 has a longitudinal center of gravity ("LCG"). The LCG shown in FIG. 2 is with a full fuel tank and all four ballast tanks 210 full. Other fuel and ballast conditions (including the location of occupants) may shift the position of the LCG forward or aft from the location shown in FIG. 2. The resultant forces from the water in the ballast tanks 210 preferably are applied aft of the LCG to achieve the desired change in pitch. In this embodiment, the port and starboard ballast tanks 212, 214 are located aft of the control console 132 and, in particular, in the aft half of the boat 100, with the aft end of each of the port and starboard ballast tanks 212, 214 being located proximate to the transom 114.

The geometry of each of the port ballast tank 212 and starboard ballast tank 214 is preferably constructed to have a generally symmetrical distribution of water about the longitudinal centerline 102 of the boat 100, and in particular that the moment about the centerline of the boat created by the port ballast tank 212 when filled is balanced by the moment in the opposite direction created by the starboard ballast tank 214 when filled. In this embodiment, each of the port and starboard ballast tanks 212, 214 is located along the bottom of the hull 110 and the bottom surfaces of each of the port and starboard ballast tanks 212, 214 has a shape that corresponds to the adjacent part of the hull. When viewed from above (as shown in FIG. 2), each of the port and starboard ballast tanks 212, 214 has a generally rectangular shape and is oriented such that the port and starboard ballast tanks 212, 214 extend in the longitudinal direction of the boat 100. Each of the port and starboard ballast tanks 212, 214 has an overall length in the longitudinal direction of the boat 100 that is greater than the width in the athwartships direction, which is perpendicular to the longitudinal direction of the boat 100. The transverse ballast tank 220 is not limited to generally rectangular configurations or linear configurations from port to starboard. Other suitable geometries may be used including, for example, V-shaped, U-shaped, or O-shaped configurations (as viewed from above, the perspective of FIG. 2).

The center ballast tank 216 is located between the longitudinal stringers in the center third of the boat 100. Water may be added to the center ballast tank 216 to further increase the displacement of the boat 100 and thus create a larger wake behind the boat 100. In this embodiment, the center ballast tank 216 is located in the forward half of the boat 100, forward of the LCG. In this location, the weight added by water in the center ballast tank 216 offsets some of the change in pitch caused by added ballast in ballast tanks located in the aft half of the boat 100, such as the port ballast tank 212, the starboard ballast tank 214, and the transverse ballast tank 220. As with the port and starboard ballast tanks 212, 214, the center ballast tank 216 is located in a cavity formed between the deck 134 and the hull 110 and, in this embodiment, is located at a level lower than the floor 136 of the deck 134.

The fourth ballast tank contained in the boat 100 of this embodiment is a transverse ballast tank 220. The transverse ballast tank 220 may be used to increase the displacement of the boat 100 and create a larger wake for water sports such as wakeboarding and wake surfing. Like the port and starboard ballast tanks 212, 214, the transverse ballast tank 220 is preferably located aft of the control console, more preferably in the aft half of the boat, and even more preferably aft of the LCG. In this way, water added to the transverse ballast tank 220 changes the pitch (bow up) of the boat 100 in addition to increasing the displacement of the boat 100. However, the transverse ballast tank 220 is not limited to this position, and it may be positioned on or even forward of the LCG, such as in the forward half of the boat for example. When the transverse ballast tank 220 is completely filled, the additional weight increases the displacement of the boat 100, making a larger wake suitable for water sports such as wakeboarding.

Figure 15:
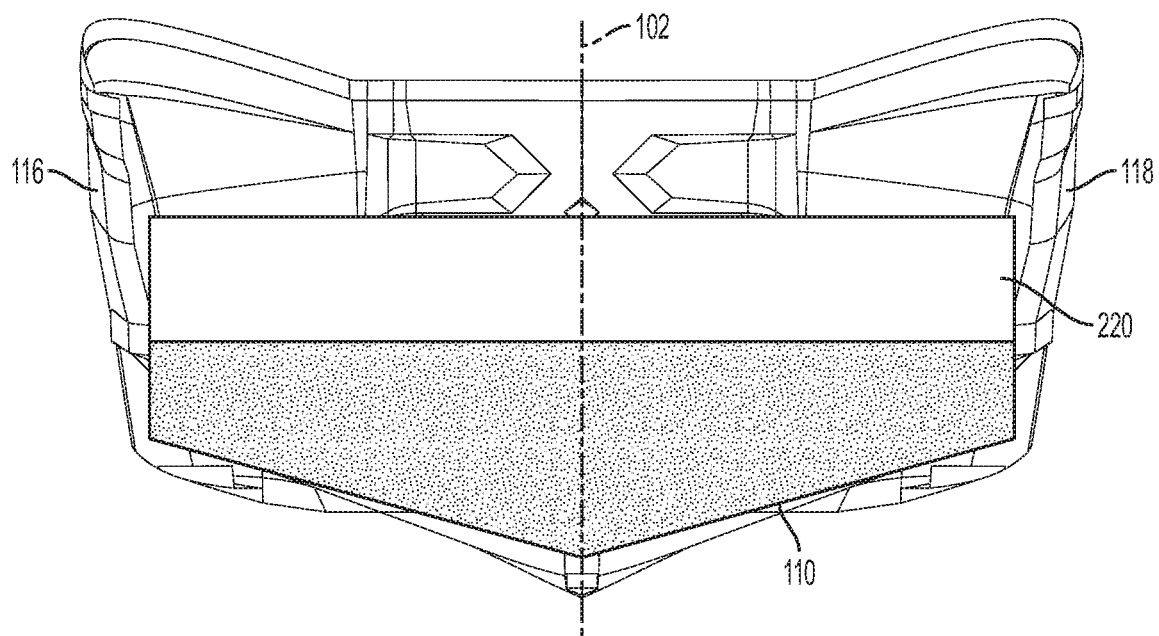
FIG. 15 is the view shown in FIG. 6, with an alternate configuration of the first preferred embodiment of the invention.
Figure 16:
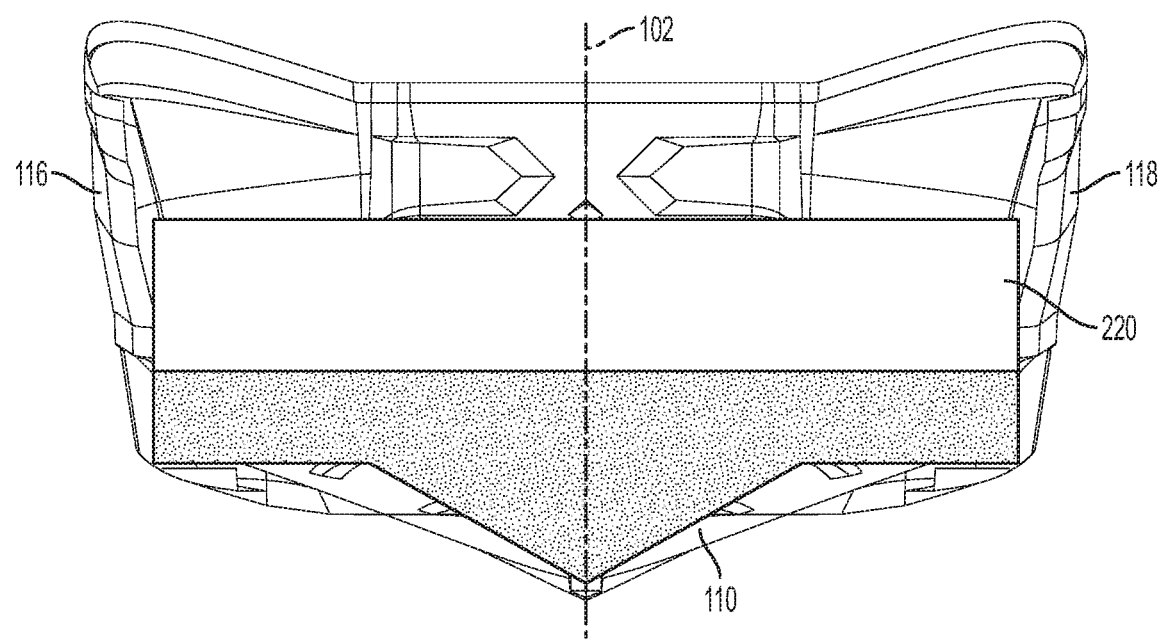
FIG. 16 is the view shown in FIG. 6, with another alternate configuration of the first preferred embodiment of the invention.

The transverse ballast tank 220 has a port-side portion 222 located on the port side of the longitudinal centerline 102 and a starboard-side portion 224 located on the starboard side of the longitudinal centerline 102. In this embodiment the port-side and starboard-side portions 222, 224 are discrete portions of the tank that are fluidly connected to each other by a center portion 226 of the ballast tank. The transverse ballast tank 220 is not so limited, however, and may have other suitable geometries, including, for example, the geometries shown in FIGS. 15 and 16. The transverse ballast tanks 220 shown in each of FIGS. 15 and 16 do not have a discrete port-side portion 222 and a discrete starboard side portion 224. In geometries without discrete port-side and starboard side portions 222, 224, the port-side portion 222 is the entire portion of the transverse ballast tank 220 that is located on the port side of the boat, and similarly, the starboard-side portion 224 is the entire portion of the transverse ballast tank 220 that is located on the starboard side of the boat 100. Both of the transverse ballast tanks 220 shown in FIGS. 15 and 16 are generally rectangular with a V-shaped bottom. In FIG. 15, the V-shaped bottom extends the full length of the transverse ballast tank 220 in the athwartships direction, but in FIG. 16 the V-shaped bottom is only in the center portion of the transverse tank 220. Further details of the transverse ballast tank 220 and how it is used for water sports, such as wake surfing, will be described further below.

In addition to the ballast tanks 210 discussed herein, the boat 100 also may contain ballast bags holding additional ballast. In some embodiments, these ballast bags may be integrated into the ballast system 200 of the boat. For example, a ballast bag (not shown) may be plumbed in series with each of the port ballast tank 212 and the starboard ballast tank 214. The ballast bag may be fluidly connected to a corresponding ballast tank 212, 214 by a line located near the top of the corresponding ballast tank 212, 214, such that, as the port or starboard ballast tank 212, 214 nears being filled, the ballast bag begins to fill.

Each of the ballast tanks 210 may be filled with water from the body of water in which the boat 100 sits by using a ballast fill-and-drain system. In this embodiment, there is a through-hull penetration for each of the ballast tanks 210. A valve 232, such as a seacock, is located at the through-hull penetration and can be opened and closed to isolate each ballast tank and its associated fill-and-drain components. At least one fill/drain line 234 connects each ballast tank to a corresponding seacock valve 232. The fill/drain lines 234 are connected to each ballast tank 210 at a lower portion of each ballast tank 210. A pump 236 is located in in each fill/drain line 234 between the seacock valve 232 and the corresponding ballast tank 210. The pump 236 may be operated to pump water from the body of water in which the boat sits into its corresponding ballast tank 210 via the fill/drain line 234. The ballast pumps 236 used herein are preferably self-priming, reversible impeller pumps. This allows the pump 236 to also be operated in a reverse direction to drain (discharge) water from the corresponding ballast tank 210, instead of, for example, using one pump to fill and another pump to drain. A benefit of using self-priming, reversible impeller pumps 236 in this embodiment is that the ballast tanks 210 can be filled when the boat 100 is at any speed. Unlike scoops, for example, the ballast tanks 210 can be filled while the boat 100 is stationary, but using pumps 236 also allows filling the ballast tanks 210 while the boat 100 is moving through the water.

Standard reversible impeller pumps for marine ballast use are designed to operate at 10-15 gallons per minute (GPM) with one inch fittings. In this embodiment, however, the pumps 236 are 30 GPM reversible impeller pumps (high-flow pumps) using 1.5 inch fittings for the fill/drain lines 234 between the pump 236 and the corresponding ballast tank 210. A suitable high-flow pump is made by SPX/Johnson of Orebro, Sweden.

Increasing the size of the pump 236 reduces the time to fill or drain, but a further reduction in the time to fill or drain may be desired. Preferably, the ballast system 200 is designed such that the ballast tanks 210 are filled within the time it takes for a water sports participant to be ready. For example, the location where the water sport will be performed is often away from the dock or launch. A user will thus drive the boat to the location where the water sport will be performed and then stop so that the water sports participant can get ready, which may include, for example, putting on a life jacket, getting the board out from its storage location, and fastening a tow rope to the tow-line-attachment structure 148. Such activities can take about 5 minutes. The ballast system 200 preferably is configured to fill all of the ballast tanks 210 within this time and thus preferably is configured to fill all of the ballast tanks 210 in less than 6 minutes, more preferably less than 5 minutes, and even more preferably less than 4 minutes. In this embodiment, using a single high-flow pump 236 per ballast tank 210 allows filling a ballast tank 210 having a capacity from 64 gallons (gal.) to 120 gal. within 4 minutes, a ballast tank 210 having a capacity from 80 gal. to 150 gal. within 5 minutes, and a ballast tank 210 having a capacity from 96 gal. to 180 gal. within 6 minutes.

The ballast tanks 210 discussed herein can be of any suitable size, but larger tanks 210 are desirable for producing wakes for wakeboarding and wake surfing. Using multiple ballast pumps 236 per ballast tank, preferably in combination with high-flow pumps, enables filling even larger ballast tanks 210 by the time the water sports participant is ready. In the preferred embodiments herein, each ballast tank 210 has two fill/drain lines 234 and is filled and drained by two ballast pumps 236. A first port-side ballast pump 242a and a second port-side ballast pump 242b are used to fill and drain the port-side ballast tank 212. A first starboard-side ballast pump 244a and a starboard-side ballast pump 244b are used to fill and drain the starboard-side ballast tank 214. A first center ballast pump 246a and a second center ballast pump 246b are used to fill and drain the center ballast tank 216. And a first transverse ballast pump 248a and a second transverse ballast pump 248b are used to fill and drain the transverse ballast tank 220. In this embodiment, using a two high-flow pumps 236 per ballast tank 210 allows filling a ballast tank 210 having a capacity from 128 gallons (gal.) to 240 gal. within 4 minutes, a ballast tank 210 having a capacity from 160 gal. to 300 gal. within 5 minutes, and a ballast tank 210 having a capacity from 192 gal. to 360 gal. within 6 minutes. Where a combination of a ballast tank 210 and a ballast bag is used, the capacity of the ballast tank 210 would be reduced by the corresponding size of the ballast bag to meet the preferred time constraints discussed herein.

Although each of the ballast tanks 210 is shown with two ballast pumps 236, the boat 100 is not so limited. For example, the center ballast tank 216 may be smaller than the port-side ballast tank 212 and the starboard side-ballast tank 214. Even with two ballast pumps 242a, 242b, 244a, 244b per ballast tank 212, 214, the time to fill the port-side ballast tank 212 and the starboard side-ballast tank 214 may be the rate limiting time. And thus a single center ballast pump 246 may be used for the smaller, center ballast tank 216 without increasing the total amount of time to fill all of the ballast tanks 210.

Each of the ballast tanks 210 includes a vent line 238 that connects to the top of each ballast tank 210 and allows the tank to be vented to the atmosphere. The vent line 238 also may serve as an overflow. When ballast bags are used, the ballast bags may have their own vent line 238 separate from the corresponding ballast tank 210. When the ballast tank 210 is full and the pump 236 is operated to add water to the ballast tank 210, water is pushed out of the ballast tank 210, through the vent line 238, and allowed to stream from the side of the hull 110. Using the self-priming, reversible impeller pumps of this embodiment enables the water to remain in the ballast tanks 210 without the use of a valve in the vent line 238.

As discussed above, the reversible nature of the pumps 236 of this embodiment allows the ballast tanks 210 to be drained using the same pump with which they were filled. In this embodiment, the pumps 236 can be used to empty the ballast tanks 210 while the boat 100 is being operated or while stationary. Once the water sports participants are finished with the water sport, the gear can be stowed. The ballast system 200 preferably is configured to empty all of the ballast tanks 210 within the amount of time it takes to stow the gear used for the water sport and thus preferably is configured to empty all of the ballast tanks 210 in less than 6 minutes, more preferably less than 5 minutes, and even more preferably less than 4 minutes. Using the configuration of the ballast pumps 236 discussed above, the ballast tanks 210 can be emptied at rates similar to their fill rates and are thus emptied within the preferred times discussed above.

Although the ballast tanks 210 of this embodiment preferably are filled using a pump 236, other suitable fill-and-drain systems may be used, including, for example, a water scoop in addition to or in place of the pump 236 and through-hull penetration.

Figure 4A:
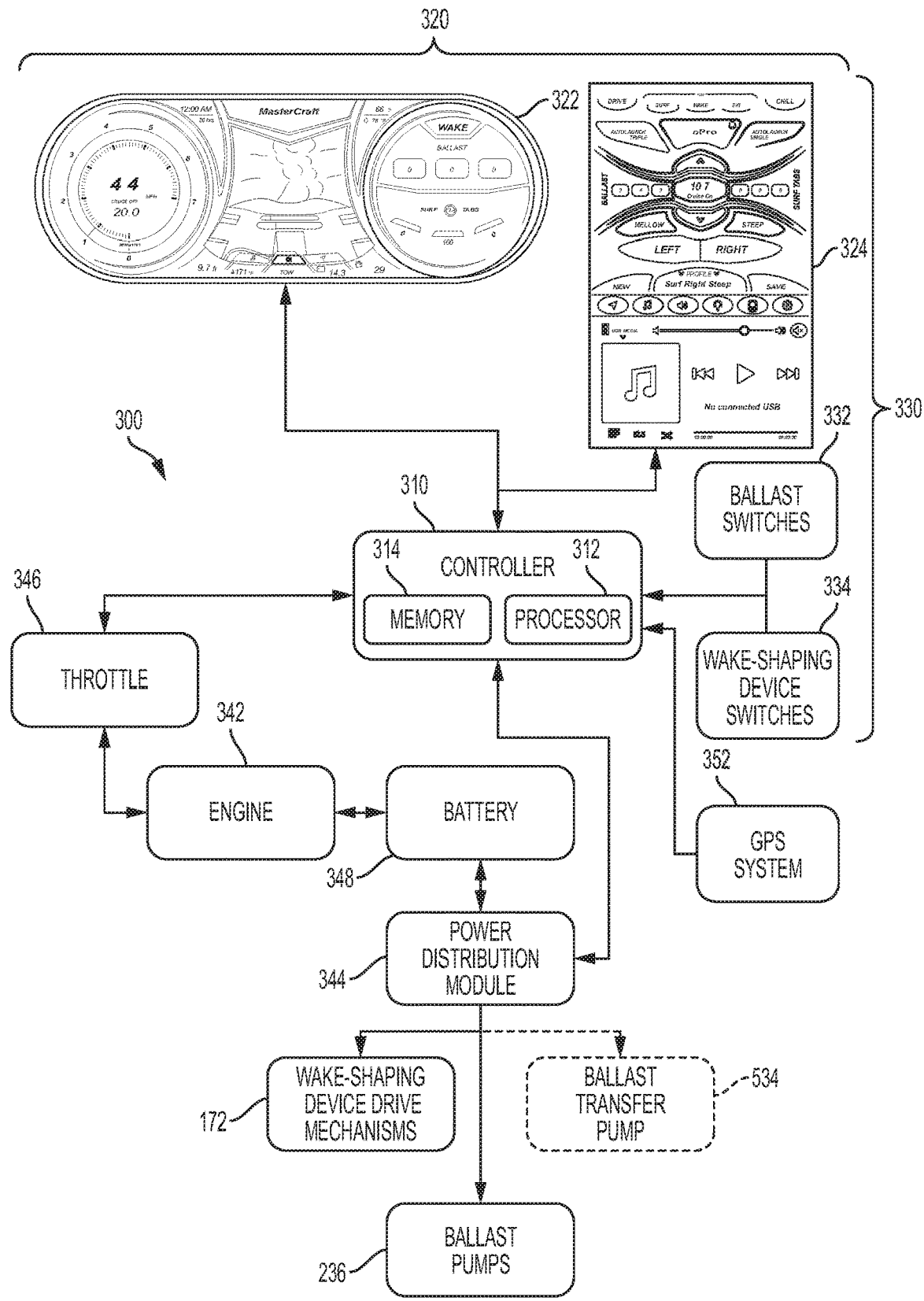
FIG. 4A is a schematic diagram of the control system for the boat shown in FIG. 1.

The fill-and-drain system may be operated through a control system 300 for the boat 100. FIG. 4A is a schematic diagram of the control system 300 for the boat 100 shown in FIG. 1. The control system 300 includes a controller 310. In this embodiment, the controller 310 is a microprocessor-based controller that includes a processor 312 for performing various functions, discussed further below, and a memory 314 for storing various data. The controller 310 may also be referred to as a CPU. In one embodiment, the various methods discussed below may be implemented by way of a series of instructions stored in the memory 314 and executed by the processor 312.

The controller 310 is communicatively coupled to a display screen 320. In this embodiment, the controller 310 is communicatively coupled to two display screens: a center display 322 and a side display 324. The controller 310 is configured to display on the display screens 320 various operational parameters of the boat 100, including, for example, the fill level of the ballast tanks 210 and the position of wake-shaping devices 150, 160 (discussed further below). In this embodiment, both displays 320 are located at the control console 132 for the boat 100. Additional details of the control system may be found in U.S. patent application Ser. No. 15/633,723, which is incorporated by reference herein in its entirety.

The controller 310 also is communicatively coupled to and responsive to input devices 330. In this embodiment, the side display 324 is a touchscreen display and is an input device 330. The controller 310 is configured to display user-selectable options on the side display 324. The user-selectable options are icons displayed on the side display 324 that may be selected by a user pressing the icon. The terms icon, virtual button, and button may be used interchangeably herein to describe these and other user-selectable options displayed by the controller 310 on the side display 324. Other input devices 330 may include buttons or switches that are communicatively coupled to the controller 310. For example, the boat 100 of this embodiment includes ballast switches 332 and wake-shaping device switches 334.

In this embodiment, a user has various options to add water to the ballast tanks 210. For example, a user may move the ballast switch 332 for the transverse ballast tank 220 to a fill position. The ballast switch 332 sends a signal to the controller 310 to turn on the ballast pumps 236 for the transverse ballast tank 220 and operate the ballast pumps 236 in a direction to fill the transverse ballast tank 220. The controller 310 receives the signal (command) from the ballast switch 332 and sends a signal to the power distribution module (PDM) 344 to provide power to the ballast pumps 236 in a direction that fills the transverse ballast tank 220. In response, the PDM 344 receives electrical power from the battery 348 and then transmits power to the ballast pumps 236 to fill the transverse ballast tank 220. When the ballast switch 332 is moved to a neutral position, the controller 310 stops receiving a fill signal from the ballast switch 332 and the control sends a signal to the PDM 344 to stop providing power to the ballast pumps 236. To remove water from the transverse ballast tank 220, a user may move the corresponding ballast switch 332 to an empty position. The controller 310 and corresponding components then respond similarly as they do in response to a fill signal, but operate the ballast pumps 236 in a direction to remove water from the transverse ballast tank 220. Instead of being a physical switch, the ballast switches 332 may be implemented as a virtual button on the side display 324.

Figure 4B:
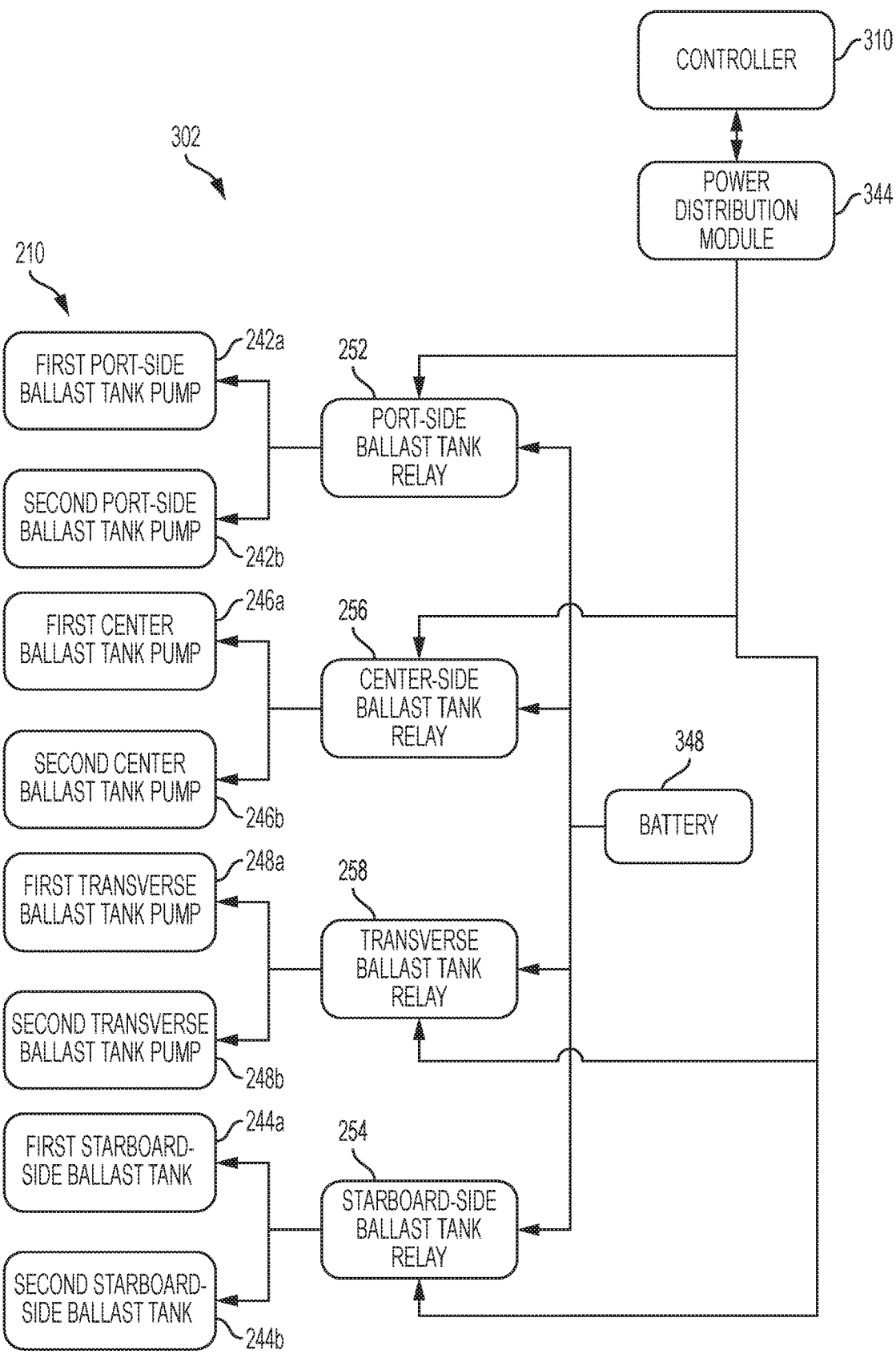
FIG. 4B is a schematic diagram of an alternate control system for the boat shown in FIG. 1.

When multiple ballast pumps 236 are used for each ballast tank 210, and in particular, multiple high-flow pumps, an alternate control system 302 may be used. FIG. 4B is a schematic diagram of a portion the alternate control system 302 for the boat 100. Instead of the power distribution module providing the power for each ballast pump 236, in this control system 302, relays 252, 254, 256, 258 are used to provide the power from the battery 348 to operate each of the ballast pumps 236. Digital control systems, such as the power distribution module 344, may have current restrictions; the relays 252, 254, 256, 258 used herein, however, are not so limited. A low voltage control signal is sent from the power distribution module 344 to operate each relay 252, 254, 256, 258. Alternatively, the control signal may be sent directly from the controller 310 instead of from the power distribution module 344. In response to the control signal, the relay 252, 254, 256, 258 connects the battery over a switch capable of switching and transmitting high current (e.g., from 20 amperes (amps.) to 30 amps.) to operate the ballast pump 236 in the appropriate direction. As the ballast pumps used herein are reversible, the relays 252, 254, 256, 258 are suitably double throw.

In the control system 302 shown in FIG. 4B, the relays 252, 254, 256, 258 allow a single control signal to simultaneously close two circuits, and is particularly suited for the application discussed herein. With this construction, a single relay, in response to a single control signal, operates the two ballast pumps for each ballast tank simultaneously. As shown in FIG. 4B, a port-side ballast tank relay 252 connects the battery 348 with each of the first port-side ballast tank pump 242a and the second port-side ballast tank pump 242b. A starboard-side ballast tank relay 254 connects the battery 348 with each of the first starboard-side ballast tank pump 244a and the second starboard-side ballast tank pump 244b. A center ballast tank relay 256 connects the battery 348 with each of the first center ballast tank pump 246a and the second center ballast tank pump 246b. And a transverse ballast tank relay 258 connects the battery 348 with each of the first transverse ballast tank pump 248a and the second transverse ballast tank pump 248b.

Figure 5:
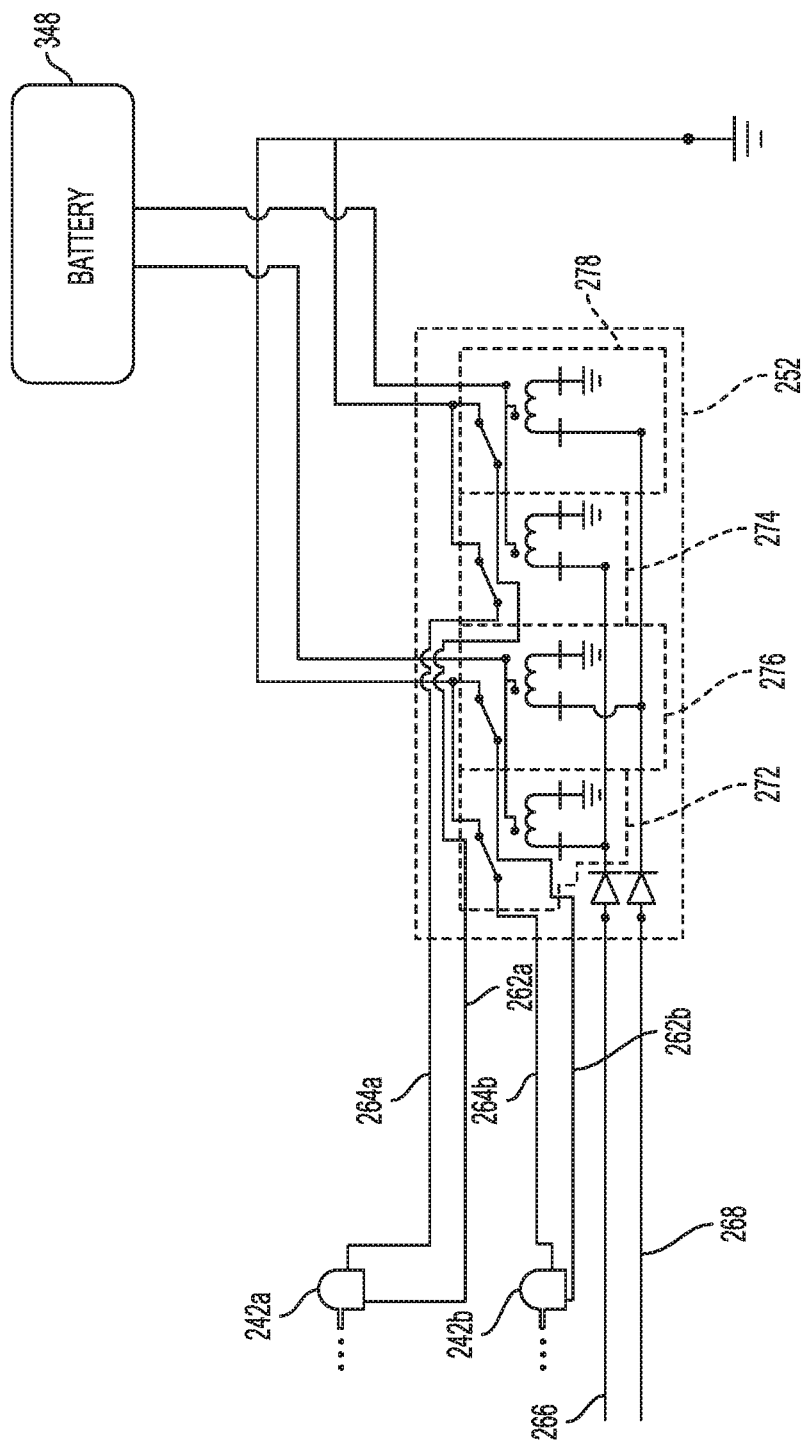
FIG. 5 is an electrical schematic diagram of the port-side ballast tank relay.

FIG. 5 shows a detailed electrical schematic diagram of the port-side ballast tank relay 252. This schematic is equally applicable to the other ballast tank relays 254, 256, 258. The relay 252 is connected to the battery 348 and a ground. In this embodiment, the ground for each of the ballast pumps 236 is a common ground bus, which is electrically connected to the engine block. The first port-side ballast tank pump 242a and the second port-side ballast tank pump 242b are each operated by a reversible direct-current motor. The motor of the first port-side ballast tank pump 242a is electrically connected to a first terminal 262a and a second terminal 264a of the relay 252. The motor of the second port-side ballast tank pump 242b is electrically connected to a third terminal 262b and a fourth terminal 264b of the relay 252. The relay 252 includes two control lines, a first control line 266 and a second control line 268. To operate the port-side ballast pumps 242a, 242b in a first direction to, for example, fill the port-side ballast tank 212, a control signal is sent though the first control line 266. The control signal sent through the first control line 266 simultaneously operates a first switch 272 and a second switch 274 of the relay 252 to close each of the circuits and drive the port-side ballast pumps 242a, 242b in the first direction for as long as the control signal is applied. To operate the port-side ballast pumps 242a, 242b in a second direction to, for example, empty the port-side ballast tank 212, a control signal is sent though the second control line 268. The control signal sent through the second control line 268 simultaneously operates a third switch 276 and a fourth switch 278 of the relay 252 to close each of the circuits and drive the port-side ballast pumps 242a, 242b in the second direction for as long as the control signal is applied.

Instead of using the ballast switches 332, a user may select a user-selectable option, such as fill all, a wakeboard setting, or a surf setting on the side display 324. The side display then sends a corresponding command to the controller 310. Upon receipt of the command, the controller 310 then operates the ballast pumps 236 in the appropriate direction for a predetermined amount of time to fill or empty the ballast tanks 210 to a predetermined level saved in the memory 314 and corresponding to the user-selectable option selected. A user may also input a desired level for a particular ballast tank 210 into the side display 324 and then the controller 310 operates the ballast pumps 236 for the appropriate time to adjust the water level in the ballast tank 210 to the desired level. The controller 310 monitors the operational time of the ballast pumps 236 in a particular direction and uses the time to display the level of the ballast tanks 210 on the display screens 320. Although this embodiment uses the time of ballast pump 236 operation to set and display the appropriate level of ballast in the ballast tanks 210, other suitable methods may be used, including sensors, such as floats, communicatively coupled to the controller 310.

The boat 100 of this embodiment is particularly suited for wake surfing. In wake surfing, a surfer (water sports participant) is pushed by the wake of the boat 100 on a surfboard without the use of a tow rope. The wake surfer is propelled by one of the two divergent waves that make up the boat's wake, and the side of the boat on which the surfer surfs is the surf side. The surfer may initially use a tow rope to get up on the surfboard and into the wave, and some surfers, particularly those with less experience, may hold onto the tow rope in case the surfboard moves out of the portion of the wave the propelling the surfer. But once in the wave and surfing, the wave is principally providing the force to propel the surfer instead of the tow rope. The boat 100 of this embodiment may be operated to produce a wave on at least one side of the boat 100 that is desirable for wake surfing. Ballast and a surf device, such as the wake-shaping devices 150, 160, may be used not only to increase the size of the wave on the surf side of the boat for wake surfing, but also to shape the wake and clean up the wave on the surf side of the boat for wake surfing.

Figure 6:
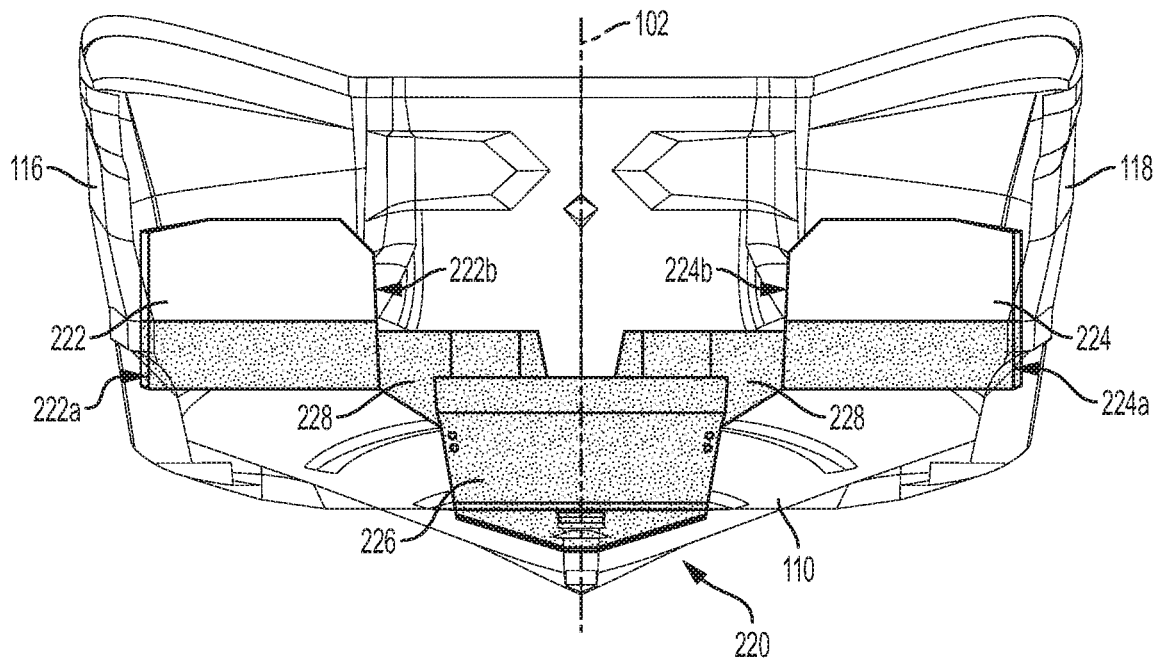
FIG. 6 is an aft perspective view of the boat shown in FIG. 1 with the transom removed showing the transverse ballast tank partially filled.

When used for wake surfing, the transverse ballast tank 220 is preferably only partially filled, as shown in FIG. 6. The stippling in FIG. 6 and subsequent figures illustrates water in the transverse ballast tank 220. Although the ballast switches 332 may be used to partially fill the transverse ballast tank 220, a user may select one of a plurality of user-selectable options displayed on the side display 324. For example, the side display 324 may include a surf left button and a surf right button. When either of the surf buttons is selected, the controller 310 operates the ballast pumps 236 for the transverse ballast tank 220 so that the transverse ballast tank is partially full at a predetermined level stored in the memory 314 and corresponding to the surf setting. When there is more water in the transverse ballast tank 220 than the predetermined level, such as when the transverse ballast tank is full, the controller 310 operates the ballast pumps to remove water from the transverse ballast tank 220, and when there is less water in the transverse ballast tank 220 than the predetermined level, such as when the transverse ballast tank is empty, the controller 310 operates the ballast pumps to add water to the transverse ballast tank 220. In this embodiment, each of the port ballast tank 212, starboard ballast tank 214, and center ballast tank 216 preferably is completely filled for wake surfing.

When the transverse ballast tank 220 is partially filled, the water contained in the transverse ballast tank 220 is preferably distributed throughout the transverse ballast tank 220 such that, when the boat is even, the water in the transverse ballast tank 220 does not impart a roll moment to the boat 100. In this embodiment, the transverse ballast tank 220 is symmetrical about the longitudinal centerline 102 and thus the water in that tank is equally distributed in the port-side portion 222 and the starboard side portion 224.

The boat 100 also includes a pair of wake-shaping devices 150, 160 for wake surfing. One of the wake-shaping devices 150 is located on the port side of the longitudinal centerline 102, and the other wake-shaping device 160 is located on the starboard side of the longitudinal centerline 102. In this embodiment, the pair of wake-shaping devices may be the port and starboard wake-modifying devices disclosed in U.S. Pat. No. 8,833,286, which is incorporated by reference herein in its entirety.

Each of the wake-shaping devices 150, 160 includes a plate-like member 152, 162 that is pivotably attached to the transom 114 of the boat 100. The plate-like members 152, 162 pivot about pivot axes to move between a non-deployed position and a deployed position. Each of the wake-shaping devices 150, 160 may have multiple different deployed positions in which the wake-shaping devices 150, 160 are pivoted downwardly at different angles. In this embodiment, the pivot axes are hinges 154, 164. Here, the hinges are piano hinges that are welded to a leading portion of each plate-like member and attached to the transom 114 of the boat 100 using screws. However, any suitable pivotable connection may be used and may be affixed to the transom 114 of the boat 100 and the port and starboard surf devices 150, 160 using any suitable means, including but not limited to bolts, screws, rivets, welding, and epoxy.

In the embodiment shown, the pivot axis is parallel to the deadrise (the angle of the hull from the keel to the chine at the transom 114) of the boat 100. But the pivot axis may instead be at an angle relative to the deadrise. Some boats, for example, have little or no deadrise. In such cases, it may be advantageous to orient the pivot axis at an angle relative to the deadrise. Preferably, the pivot axis is inclined no more than about 35° from horizontal, more preferably no more than about 20° from horizontal, and most preferably no more than about 15° from horizontal. This inclination is preferably in the direction from the chine to the keel. Preferably, the pivot axis is inclined no more than about 15° more than the deadrise.

Each of the wake-shaping devices 150, 160 also may include one or more downturned surfaces 156, 166, one or more upturned surfaces 158, 168, and one or more fins 159, 169. In this embodiment, for example, each wake-shaping device 150, 160 includes two downturned surfaces 156, 166 at a trailing portion of the plate-like member 152, 162, and in particular along the trailing edges of the plate-like member 152, 162. Each wake-shaping device 150, 160 also includes a downturned surface 156, 166 at an inboard portion of the plate-like member 152, 162, and in particular along an inboard edge of the plate-like member 152, 162. Also in this embodiment, each wake-shaping device 150, 160 includes two upturned surfaces 158, 168 at an outboard portion of the plate-like member 152, 162, and in particular along an outboard edge of the plate-like member 152, 162. In addition, each wake-shaping device 150, 160 includes a pair of fins 159, 169 attached to a lower surface of the plate-like member 152, 162 and oriented at an oblique angle relative to the pivot axis.

Each of the wake-shaping devices 150, 160 is moveable between the deployed position and the non-deployed position by a drive mechanism 172. In the embodiment shown, one drive mechanism 172 is used for each wake-shaping devices 150, 160, allowing them to be independently operated. Each of the drive mechanisms 172 shown in this embodiment is a linear actuator. The linear actuator preferably is an electric linear actuator, such as one available from Lenco Marine. One end of the linear actuator is connected to the transom 114 of the boat 100 and the other end is connected to the wake-shaping devices 150, 160. Any suitable means may be used to move the wake-shaping devices 150, 160 between the deployed and non-deployed positions, including but not limited to hydraulic linear actuators, gas assist pneumatic actuators, and electrical motors.

In the deployed position, a trailing portion of the wake-shaping device 150, 160 is lower than it is in the non-deployed position. The wake-shaping device 150, 160 is attached to the aft half of the hull 110, and as discussed above, to the transom 114 in this embodiment. When in the deployed position, the wake-shaping device 150, 160 extends downwardly into the flow of water flowing along the bottom of the hull 110. The water impinging on the deployed wake-shaping devices 150, 160 creates a vertical lift force on the portion of the boat 100 to which the wake-shaping devices 150, 160 is attached. For wake surfing, the wake-shaping devices 150, 160 are preferably asymmetrically deployed to roll the boat to one side.

Figure 7:
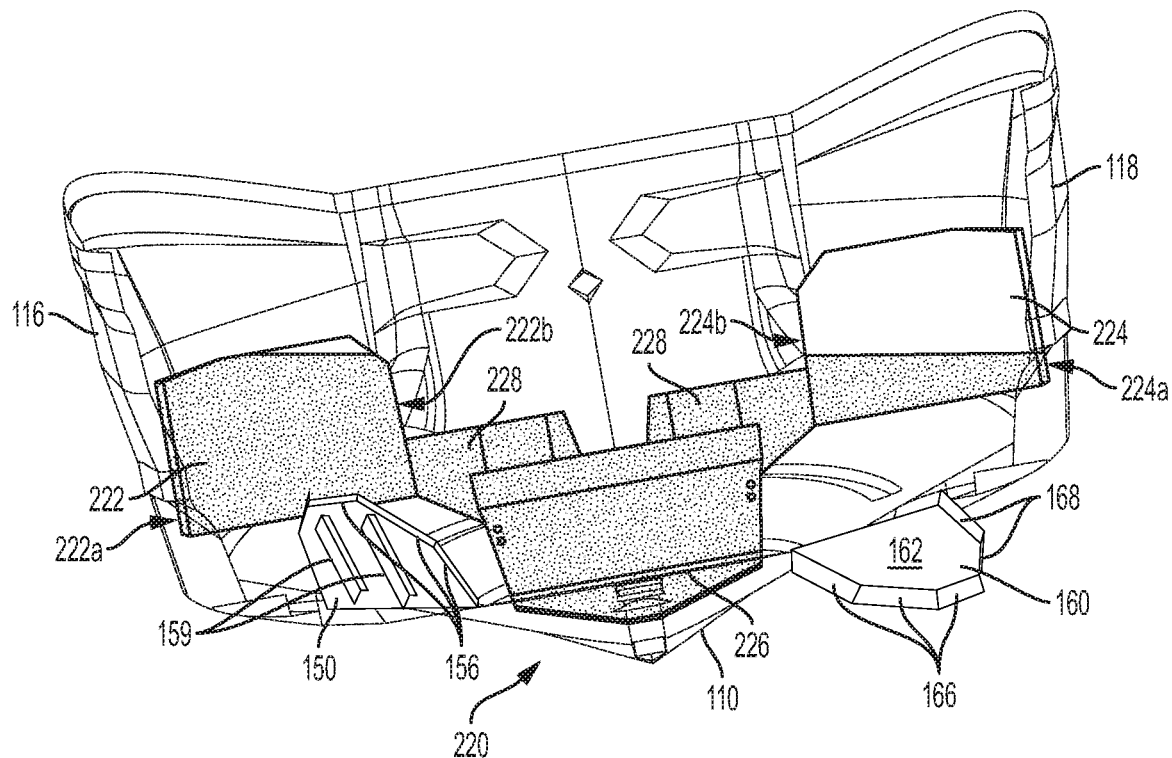
FIG. 7 is the view shown in FIG. 6, with the boat rolled to port for wake surfing on the port side.

For example, the controller 310 receives a command from the side display 324 when the surf left user-selectable option is selected on the side display 324. The controller 310 then sends a signal to the PDM 344 to provide power the drive mechanism 172 for the starboard wake-shaping device 160 to move the starboard wake-shaping device 160 to a deployed position and to provide power to the drive mechanism 172 for the port wake-shaping device 150 to move the port wake-shaping device 150 to the non-deployed position, if not already there, as shown in FIG. 7.

To begin surfing, a user may move a control lever (not shown) forward from a neutral position to engage a running gear with a drive shaft, accelerate the engine 342 using a throttle 346 (see FIG. 4A), and rotate the propeller to drive the boat 100 forward. A user may manually control the speed of the boat 100 for surfing using the control level and throttle 346. Alternatively, the speed of the boat 100 may be controlled by a cruise control. For example, the cruise control may be a GPS-based system, where the controller 310 is communicatively coupled to a GPS system 352, and receives the speed of the boat 100 from the GPS system 352. Instead of a GPS system 352, the controller 310 may be coupled to another suitable speed sensing device to determine the speed of the boat 100. The controller 310 then operates the throttle 346 to maintain the speed of the boat 100 at a set speed. The set speed for the cruise control is a speed suitable for surfing, preferably from 9 mph to 12 mph.

As the boat 100 is moved through the water, the water flowing under the hull 110 impinges on the deployed starboard wake-shaping device, rolling the boat 100 to port. With the boat 100 rolled to port the water in the transverse ballast tank 220 shifts toward the port side of the boat 100, as shown in FIG. 7. In particular, at least a portion of the water in the starboard-side portion 224 flows to the port-side portion 222. With the water in the transverse ballast tank 200 shifting to the surf side of the boat, which in this example is the port side, ballast is added to the surf side and removed from the non-surf side. A roll moment toward the surf side of the boat 100 (counterclockwise when viewed from a position aft of the boat 100) is thus created by the change in ballast, further rolling the boat 100 beyond the roll created by the deployed starboard wake-shaping device 160 (an additional degree of roll in this example). Because this change in ballast occurs as a result of the water flowing from one side to the other, the weight shift is relatively fast and also is quickly reversible. For example, when the boat 100 is stopped (such as by a user moving the control lever to the neutral position) the roll imparted by the deployed wake-shaping device 160 is removed. As a result, the water flows back and is distributed like it was before the boat started moving.

Figure 8:
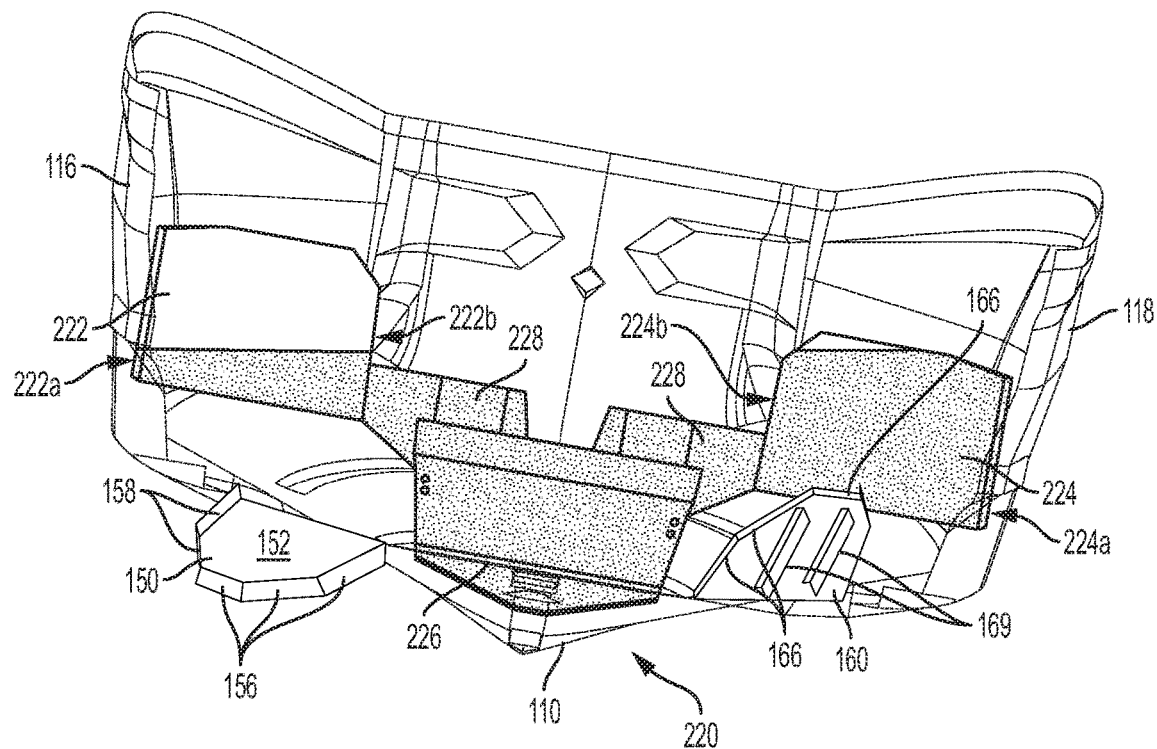
FIG. 8 is the view shown in FIG. 6, with the boat rolled to starboard for wake surfing on the starboard side.

The same approach may be used for surfing on the starboard side of the boat 100. For example, a user may select the surf right user-selectable option on the side display 324. The controller 310 the moves the port wake-shaping device 150 to its deployed position and the starboard wake-shaping device 160 to its non-deployed position, if not already there. Then as the boat 100 is accelerated through the water, as discussed above, the boat 100 rolls toward the starboard side. With the boat 100 rolled to starboard, the water in the transverse ballast tank 220 shifts toward the starboard side of the boat 100, as shown in FIG. 8. In particular, at least a portion of the water in the port-side portion 224 flows to the starboard-side portion 222. With the water in the transverse ballast tank 200 shifting to the surf side of the boat, which in this example is the starboard side, ballast is added to the surf side and removed from the non-surf side. A roll moment toward the surf side of the boat 100 (clockwise when viewed from a position aft of the boat 100) is thus created by the change in ballast, further rolling the boat 100 beyond the roll created by the deployed wake-shaping device 150 (an additional degree of roll in this example).

Preferably, the transverse ballast tank 220 is designed to efficiently utilize the shift in ballast. The roll is a function of the moment imparted by the shift in the ballast. As a result, the weight is preferably shifted to portions of the transverse ballast tank 220 farther from the longitudinal centerline 102. The transverse ballast tank 220 is thus oriented transversely across the boat 100 and spans from the port side 116 of the hull 110 to the starboard side 118 of the hull 110, allowing the water in the transverse ballast tank 220 to shift and maximize the moment arm of the shifted water. In this embodiment, the water in the transverse ballast tank 220 is shifted to the port-side portion 222 and the starboard-side portion 224. In the embodiment shown in FIGS. 3 and 6, each of the port-side and the starboard-side portions 222, 224 is located directly above the port ballast tank 212 and the starboard side ballast tank 214, respectively, and the port-side and the starboard-side portions 222, 224 are located on the outboard third of the boat 100. In this embodiment, an outboard side wall 222a, 224a of each of the port-side and the starboard-side portions 222, 224 is located proximate the inner surface of the port side 116 and starboard side 118 of the hull 110, respectively, and, more specifically in this embodiment, adjacent to the inner surface of the port side 116 and starboard side 118 of the hull 110. The transverse ballast tank 220 thus has a width spanning from a position proximate the port side 116 of the hull 110 to a position proximate the starboard side 118 of the hull 110. Although it is preferable for the transverse ballast tank 220 to extend from the port side 116 of the hull 110 to the starboard side 118 of the hull 110, it is not so limited, and the transverse ballast tank 220 may extend other widths across the longitudinal centerline 102. In this embodiment, the transverse ballast tank 220 is oriented such that it is orthogonal to the longitudinal centerline 102 of the boat 100 and symmetrical about the centerline 102. Other suitable orientations and geometries that extend across the longitudinal centerline 102 of the boat 100 may also be used. For example, the transverse ballast tank 220 may be oriented obliquely relative to the longitudinal centerline 102.

The level to which the transverse ballast tank 220 is partially filled also preferably maximizes the roll moment produced when water is shifted in the transverse ballast tank 220. Starting with an empty transverse ballast tank 220, an increase in water level in the tank 220 will increase the roll moment when the transverse ballast tank 220 is inclined up to a certain point. In this embodiment, that point is about three quarters full. In a transverse ballast tank 220 that is a rectangular prism and symmetrical about the longitudinal centerline 102, that point may be about half full. Above that point, the roll moment begins to decrease as the ballast resulting from the shifted water is counterbalanced by more water retained on the non-surf side of the transverse ballast tank 220.

As discussed above, the port-side and starboard-side portions 222, 224 preferably are located directly above the port ballast tank 212 and the starboard side ballast tank 214, respectively, on the outer third of the boat. As shown in FIG. 2, the transverse ballast tank 220 of this embodiment is located under the rear seats. Each of the port-side and starboard-side portions 222, 224 extends above the level of the floor 136, but below the deck 134 within the seat support structures 138. In this embodiment, the center portion 226 of the transverse ballast tank 220 is located between the port ballast tank 212 and the starboard ballast tank 214 in the center third of the boat 100. The center portion 226 is located between the port-side portion 222 and starboard side portion 224 relative to a longitudinal direction of the boat 100. The center portion is located low in the hull 110, and preferably along the bottom of the hull 110. The bottom surface of the center portion 226 thus conforms to the shape of the hull 110 adjacent to the bottom surface. The drain/fill lines 234 for the transverse ballast tank 220 connect to the transverse ballast tank at a lower portion of the center portion 226 as shown in FIG. 3. The center portion 226 is below the level of the floor 136 and the top surface of the center portion 226 is at about the level of the bottom surface of each of the port-side and starboard-side portions 222, 224, such that, as the transverse ballast tank 220 is filled, the center portion 226 is filled first and nearly completely filled before water begins filling the either of the port-side and starboard-side portions 222, 224.

Fluid connections 228 are located on an upper half of the center portion 226. The Fluid connections 228 connect the port-side portion 222 with the center portion 226 and the starboard-side portion 224 with the center portion 226. Preferably, the fluid connection 228 connects to the port-side portion 222 in the bottom half of the port-side portion 222, and likewise, the fluid connection 228 connects to the starboard-side portion 224 in the bottom half of the starboard-side portion 224. The fluid connections 228 thus provide a flow path to connect the port-side portion 222 with the starboard-side portion 224 via the center portion 226.

With the fluid connections 228 connecting to each of the port-side and the starboard-side portions 222, 224 on the bottom half, an inboard side wall 222b, 224b may thus act as a baffle when the boat 100 is rolled (and the water shifted) to the surf side. For example, when the boat is rolled to port as shown in FIG. 6, the inboard side wall 222b and the location of the fluid connections 228 limits the flow of water across the transverse ballast tank 220. If the boat 100 is exposed to a momentary roll or excitation, such as an external wave force, water in the transverse ballast tank 220 may shift within the port-side portion 222, but there is minimal flow across the full length of the transverse ballast tank 220 from the port-side portion 222 to the starboard-side portion 224. Put another way, when the boat hits a wave, the water in the transverse ballast tank 220 does not slosh back and forth between the port-side portion 222 and the starboard-side portion 224 and avoids changes in the roll moment imparted to the boat 100 by the transverse ballast tank 220.

Although the fluid connections 228 are located and sized to provide some flow restriction, as discussed above, the fluid connections 228 should also be sized provide a sufficient flow rate for the water to shift from either of the port-side or starboard-side portions 222, 224 to the other of the port-side or starboard-side portions 222, 224 when the boat 100 is rolled for wake surfing in a reasonable time. Preferably, the ballast within the transverse ballast tank 220 will shift from one side to the other in the amount of time it takes for the surf wake to develop behind the boat 100 as the boat 100 is accelerated through the water and the surf wake is initially formed or when the surf wake is switched from one side to the other as the boat 100 is moved through the water. Preferably, the ballast will shift within the transverse ballast tank 220 in less than five seconds, and more preferably, less than three seconds.

In this embodiment, the boat 100 is rolled to the surf side using wake-shaping devices 150, 160, and thus as used herein, the wake-shaping devices 150, 160 may be considered trim devices. Other suitable trim devices may be used as well, including trim tabs 412, 414, such as those shown in FIG. 9, and interceptors 420, 430, such as those shown in FIG. 10. Rolling the boat is not limited to the use of the trim devices and the specific wake-shaping devices discussed herein, however, and any suitable means and method may be used to roll the boat 100.

Figure 9:
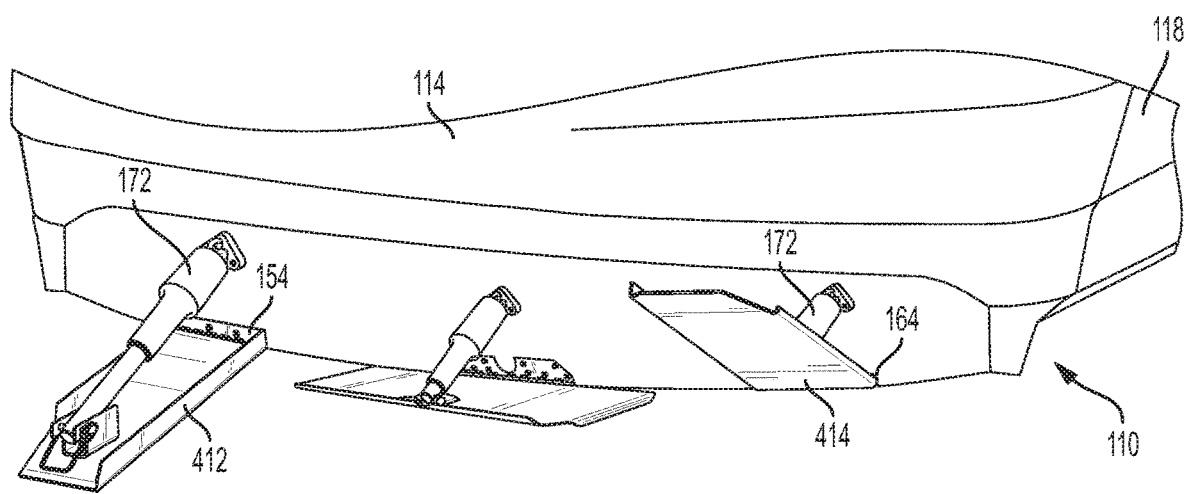
FIG. 9 shows a transom of the boat shown in FIG. 1 equipped with alternate trim devices.

FIG. 9 shows the transom 114 of the boat 100 equipped with trim tabs 412, 414. Trim tabs having any suitable geometry and size may be used. As shown in FIG. 9, for example, a port trim tab 412 and a starboard trim tab 414 may be flat, generally rectangular trim tabs. The port and starboard trim tabs 412, 414 may be pivotally attached to the transom by a hinge 154, 164 and moved between a non-deployed position and deployed positions by a drive mechanism 172 in a manner similar to the port and starboard wake-shaping devices 150, 160, discussed above.

Figure 10:
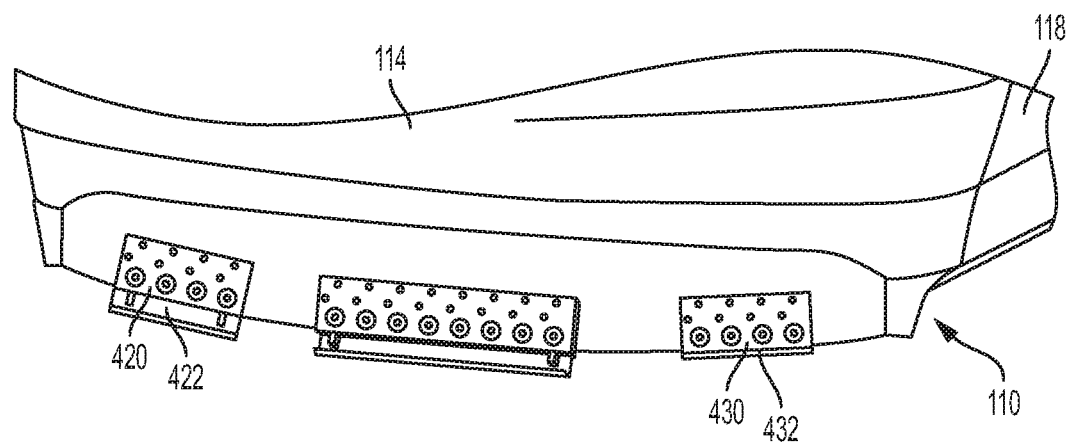
FIG. 10 shows a transom of the boat shown in FIG. 1 equipped with other alternate trim devices.
Figure 11:
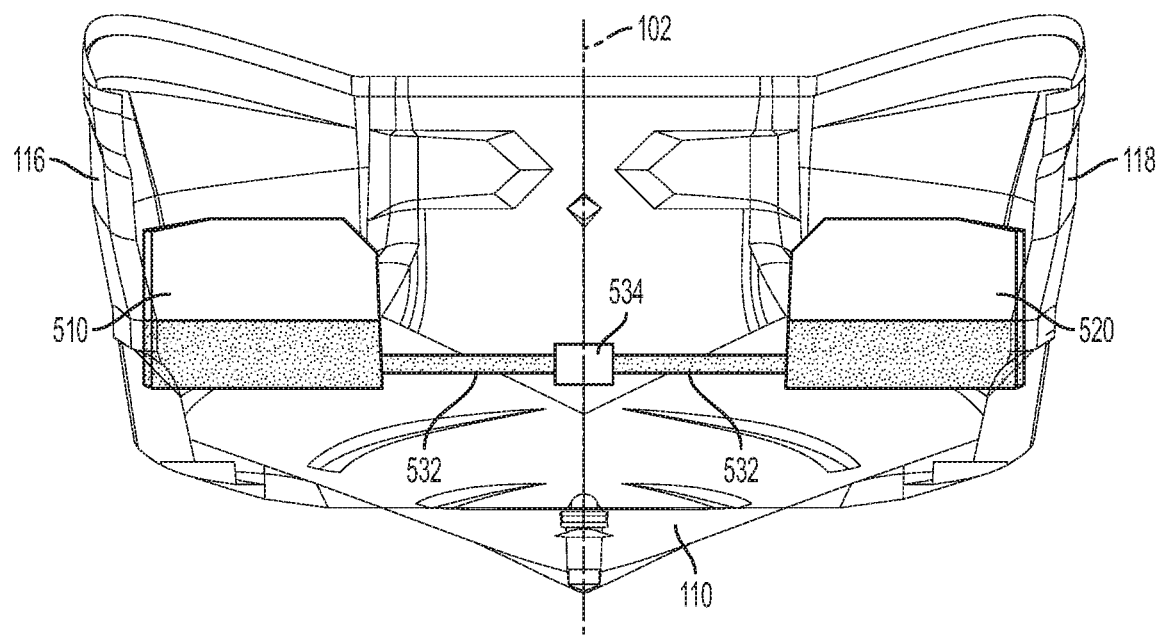
FIG. 11 is an aft perspective view of the boat shown in FIG. 1 with the transom removed showing a second preferred embodiment of the invention.

FIG. 10 shows the transom 114 of the boat 100 equipped with a port-side interceptor 420 and a starboard-side interceptor 430. These interceptors each include a blade 422, 432 that is extended, preferably in a direction parallel to the transom 114 of the boat 100, below the hull 110 to intercept the water flowing under the hull 110 and generate lift on the hull 110 just forward of the blade 422, 432. When the blades 422, 432 are extended below the hull 110, they are positioned in the deployed position, and when the blades 422, 432 are retracted, they are positioned in the non-deployed position. In FIG. 10, the port interceptor 420 is shown in a deployed position, and the starboard interceptor 430 is shown in the non-deployed position. The interceptors 420, 430 include a drive mechanism that may be operated by the controller 310 in a manner similar to the drive mechanisms 172 for the wake-shaping devices 150, 160. In other suitable embodiments, various combinations of the trim devices discussed herein can be used on the same boat 100.

Figure 12:
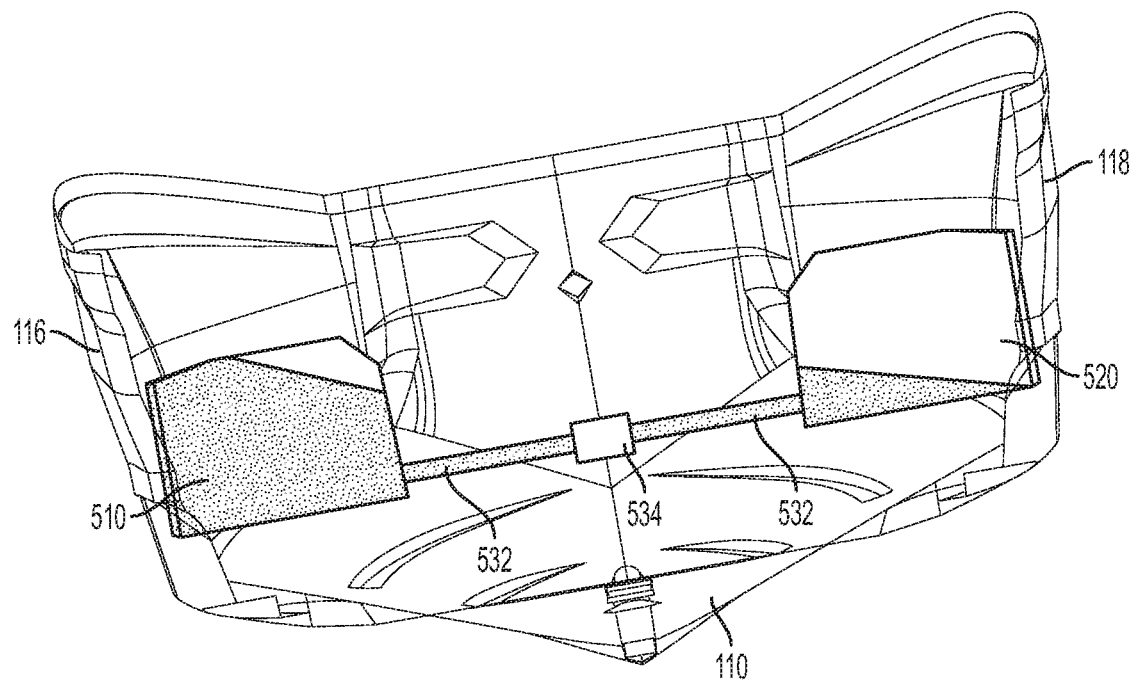
FIG. 12 is the view shown in FIG. 11, with the boat rolled to port for wake surfing on the port side.
Figure 13:
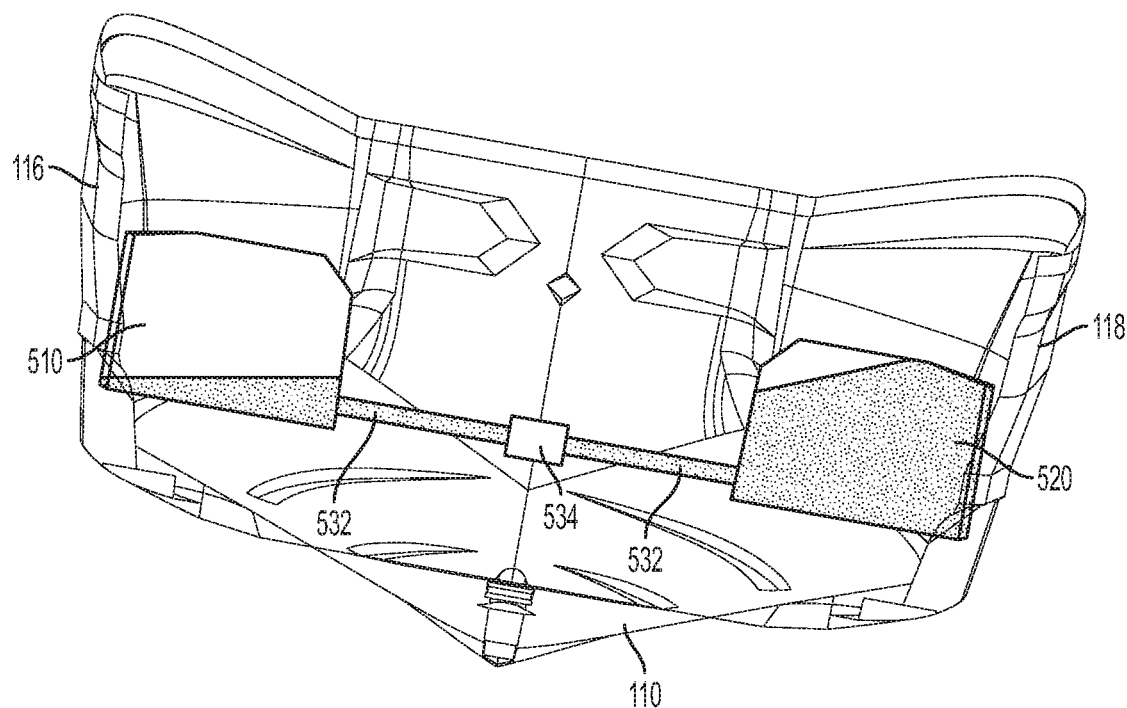
FIG. 13 is the view shown in FIG. 11, with the boat rolled to starboard for wake surfing on the starboard side.
Figure 14:
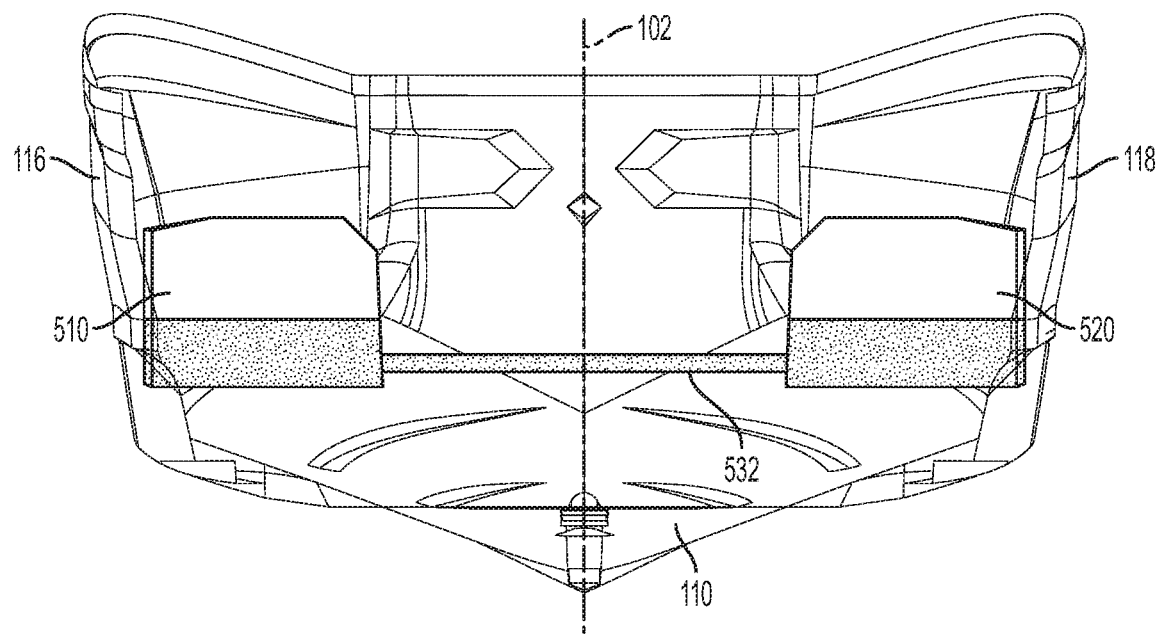
FIG. 14 is the view shown in FIG. 11, with an alternate configuration of the second preferred embodiment of the invention.

A second embodiment of the invention is shown in FIGS. 11-14. In this embodiment, two separate ballast tanks are used instead of using a single transverse ballast tank. A port-side ballast tank 510 is used in place of the port-side portion 222 of the transverse ballast tank 220 and a starboard-side ballast tank 520 is used in place of the starboard-side portion 224 of the transverse ballast tank 220. The port-side and starboard-side ballast tanks 510, 520 are fluidly connected by a flow path 532. The flow path 532 may be sized and located similarly to the fluid connections 228 of the first embodiment discussed above. A ballast transfer pump 534 may also be located in the flow path 532. The ballast transfer pump 534 may be used to assist the gravity flow of water between the port-side and starboard-side ballast tanks 510, 520 or even in place of gravity flow. FIG. 14 shows a configuration of the port-side and starboard-side ballast tanks 510, 520 connected by the flow path 532, but without the ballast transfer pump 534.

Where the ballast transfer pump 534 is used, the boat 100 may be operated to produce a surf wake as follows. The controller 310 receives a command either a user input device 330, such as the user-selectable surf left or surf right options on the side display 324. The controller 310 then partially fills each of the port-side and starboard-side ballast tanks 510, 520, in a manner similar to that discussed above with respect to the transverse ballast tank 220. The controller 310 receives the speed of the boat from the GPS system 352 or other suitable speed sensing device. The controller then determines that the boat 100 is being moved through the water for wake surfing, which in this embodiment happens when the boat has accelerated past a threshold speed, such as three or four miles per hour. Then the controller 310 sends a command to the power distribution module (PDM) 344. In response, the PDM 344 supplies power to the ballast transfer pump 534 in a direction that causes the ballast transfer pump 534 to shift at least a portion of the water in either the port-side ballast tank 510 or the starboard-side ballast tank 520 to the other of the two ballast tanks 510, 520 (see dotted lines in FIG. 4A). The water is shifted to the ballast tank 510, 520 on the surf side of the boat 100. For example, the ballast transfer pump 534 may be used to shift the water to the port-side ballast tank 510 in response to a surf left user input, as shown in FIG. 12, and the ballast transfer pump 534 may be used to shift the water to the starboard-side ballast tank 520 in response to a surf right user input, as shown in FIG. 13. Shifting the water from one ballast tank 510, 520 to the other will thus create a roll moment on the boat 100 to roll the boat 100 to the surf side.

Preferably, the ballast transfer pump 534 and flow path 532 are sized to shift the water from one of the port-side and starboard-side ballast tank 510, 520 to the other one of the port-side and starboard-side ballast tank 510, 520 within the time it takes for the surf wake to develop behind the boat 100 as the boat 100 is accelerated through the water and the surf wake is initially formed or when the surf wake is switched from one side to the other as the boat 100 is moved through the water. Preferably, the ballast will shift within the transverse ballast tank 220 in less than five seconds, and more preferably, less than three seconds. When the boat is deaccelerated, the controller 310 may send a command to the PDM 344 to supply power to the ballast transfer pump 534 in a direction that causes the ballast transfer pump 534 to shift the water back to its original condition.

Although a preferred approach of this embodiment is to use the transfer pump 534 to shift the water after the boat 100 begins to move, the transfer pump 534 may also be used (and be responsive to the controller 310 and input device 330) to shift the water between the port-side and starboard-side ballast tanks 510, 520 before the boat begins to move.

The ballast system 200 discussed herein has been discussed principally in connection with wake surfing. The boat 100 with this ballast system 200 is not so limited and may be suitably used with other sports where an increased displacement of the boat 100 is desired. Such sports may include, for example, wakeboarding. For wakeboarding, the ballast tanks 210 are each, preferably, completely filled, including the transverse tank 220. Then the boat 100 is driven at speeds suitable for wakeboarding while towing a wakeboarder behind the boat by a tow rope attached to the tow-line-attachment structure 148. Although the boat 100 may be driven manually and the ballast tanks filled manually, the control system 300, 302 and input device 330 may include at least one user-selectable option, similar to the user-selectable option for wake-surfing discussed above, which fills the ballast tanks 210 and sets the cruise speed for wakeboarding. The set speed for wakeboarding is preferably from 18 mph to 25. As with wake surfing, a user may move a control lever (not shown) forward from a neutral position to engage a running gear with a drive shaft, accelerate the engine 342 using the throttle 346 (see FIG. 4A), and rotate the propeller to drive the boat 100 forward to begin wakeboarding.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A method of operating a boat to produce a surf wake, the method comprising:
   supplying water to a transverse ballast tank to partially fill the transverse ballast tank, the transverse ballast tank being oriented transversely in the boat;
   moving the boat through a body of water at a speed of 9 mph to 12 mph;
   deploying a trim device on one side of the longitudinal centerline of the boat (i) to roll the boat toward either its port or starboard side and (ii) to shift the water in the transverse ballast tank such that at least some of the water in the transverse ballast tank moves from one side of a longitudinal centerline of the boat to the other side of the longitudinal centerline; and
   creating a surf wake on the side toward which the boat is rolled.

2. The method of claim 1, wherein the supplying step includes operating a pump to draw water from the body of water into the transverse ballast tank.

3. The method of claim 1, wherein the entirety of the transverse ballast tank is located in the aft half of the boat.

4. The method of claim 1, wherein the trim device is a trim tab or interceptor.

5. The method of claim 1, wherein the trim device is a wake-shaping device, the wake-shaping device being deployed by pivoting at least a portion of the wake-shaping device downward about a pivot axis that is horizontal or inclined no more than about 35° from horizontal.

6. The method of claim 5, wherein the wake-shaping device further includes at least one of (i) a downturned surface provided at a trailing portion of the wake-shaping device and (ii) a fin provided on a bottom surface of the wake-shaping device.

7. The method of claim 5, wherein the boat includes a transom and the wake-shaping device is pivotally attached to the transom.

8. The method of claim 1, wherein:
   the transverse ballast tank includes:
      (i) a port-side portion located on the port side of the boat's longitudinal centerline;
      (ii) a starboard-side portion located on the starboard side of the boat's longitudinal centerline; and
      (iii) a center portion fluidly connecting the port-side portion to the starboard-side portion; and
   the supplying step includes supplying water to each of the port-side portion and the starboard-side portion in a manner such that the water in the transverse ballast tank does not produce a port-to-starboard or starboard-to-port rolling moment.

9. The method of claim 8, wherein:
   the rolling step comprises rolling the boat toward the port side to move at least some of the water from other portions of the transverse ballast tank into the port-side portion of the transverse ballast tank such that the water in the transverse ballast tank produces a starboard-to-port rolling moment; and the surf wake is created on the port side of the boat.

10. The method of claim 8, wherein:

the rolling step comprises rolling the boat toward the starboard side to move at least some of the water from other portions of the transverse ballast tank into the starboard-side portion of the transverse ballast tank such that the water in the transverse ballast tank produces a port-to-starboard rolling moment; and the surf wake is created on the starboard side of the boat.

11. The method of claim 8, wherein the port-side portion of the transverse ballast tank is located within an outboard third of the boat on the port side of the boat's longitudinal centerline, and the starboard-side portion of the transverse ballast tank is located within an outboard third of the boat on the starboard side of the boat's longitudinal centerline.

12. The method of claim 1, further comprising pushing a surfer forward with the surf wake.

13. The method of claim 1, further comprising supplying water as additional ballast to at least one additional ballast tank in less than 6 minutes, the additional ballast being from 192 gallons to 360 gallons.

14. A boat comprising:

a hull including a bow, a transom, and port and starboard sides;

a control console for operating the boat;

a transverse ballast tank oriented transversely in the boat, the transverse ballast tank including:
  (a) a port-side portion located within an outboard third of the boat on the port side of the boat's longitudinal centerline;
  (b) a starboard-side portion located within an outboard third of the boat on the starboard side of the boat's longitudinal centerline; and
  (c) a center portion connecting the port-side portion to the starboard-side portion such that water in the transverse ballast tank can flow between the port-side portion and the starboard-side portion;

a ballast fill mechanism fluidly connected to the transverse ballast tank to supply water to the transverse ballast tank;

a pair of trim devices attached to the aft half of the hull, a first one of the trim devices being positioned on a port side of a longitudinal centerline of the boat, and a second one of the trim devices being positioned on a starboard side of the boat's longitudinal centerline, each of the trim devices being moveable between a deployed position and a non-deployed position;

a plurality of actuators including a first actuator configured to move the first trim device between its deployed position and its non-deployed position and a second actuator configured to move the second trim device between its deployed position and its non-deployed position;

an input device including a plurality of user-selectable options, one of the user-selectable options being a right-side surf wake, and another of the user-selectable options being a left-side surf wake; and a controller responsive to the input device and configured to, when one of the user-selectable options is selected:
  operate the ballast fill mechanism to adjust the level of water in the transverse ballast tank such that it is partially filled; and
  control at least one of the first actuator and second actuator, wherein the controller controls the first actuator to move the first trim device to its deployed position when the right-side surf wake option is selected, and controls the second actuator to move the second trim device to its deployed position when the left-side surf wake option is selected.

15. The boat of claim 14, wherein the ballast fill mechanism includes a pump to draw water from a body of water in which the boat sits into the transverse ballast tank, and the controller is configured to operate the pump to draw water from the body of water into the transverse ballast tank to partially fill the transverse ballast tank.

16. The boat of claim 14, wherein the ballast fill mechanism includes a pump to discharge water the transverse ballast tank, and the controller is configured to operate the pump to discharge water from the transverse ballast tank adjust the level of the transverse ballast tank such that it is partially full.

17. The boat of claim 14, wherein the entirety of the transverse ballast tank is located in the aft half of the boat.

18. The boat of claim 14, wherein a flow passage from the center portion to the port-side portion is located in the bottom half of the port-side portion, and a flow passage from the center portion to the starboard-side portion is located in the bottom half of the starboard-side portion.

19. The boat of claim 18, wherein the center portion is configured to hold water, and a majority the center portion is at a lower level in the boat than a majority of each of the port-side portion and the starboard-side portion when the boat is evenly keeled.

20. The boat of claim 18, wherein the transverse ballast tank has a width spanning from a position proximate the port side of the hull to a position proximate the starboard side of the hull.

21. The boat of claim 14, wherein each trim device is trim tabs or interceptors.

22. The boat of claim 14, wherein each trim device includes a pivot axis that is horizontal or inclined no more than about 35° from horizontal.

23. The boat of claim 22, wherein each trim device further includes at least one of (i) a downturned surface provided at a trailing portion of the trim device and (ii) a fin provided on a bottom surface of the trim device.

24. The boat of claim 22, wherein each trim device is pivotally attached to the transom of the boat.

25. The boat of claim 14, further comprising a port ballast tank and a starboard ballast tank and the controller is configured to fill each of the port ballast tank and the starboard ballast tank with water.

26. The boat of claim 25, further comprising a first pair of ballast pumps fluidly connected to the port ballast tank and a second pair of ballast pumps fluidly connected to the starboard ballast tank, wherein each of the port ballast tank and the starboard ballast tank are configured to hold from 192 gallons of water to 360 gallons of water, and wherein the controller is configured to fill the port ballast tank in less than 6 minutes by simultaneously operating both ballast pumps of the first pair of ballast pumps and fill the starboard ballast tank in less than 6 minutes by simultaneously operating both ballast pumps of the second pair of ballast pumps.

27. The boat of claim 25, wherein at least a portion of the port-side portion of the transverse ballast tank is located directly above the port ballast tank and at least a portion of the starboard-side portion of the transverse ballast tank is located directly above the starboard ballast tank.

28. The boat of claim 25, wherein the center portion of the transverse ballast tank is located between the port ballast tank and the starboard ballast tank.

29. A boat comprising:
a hull including a bow, a transom, and port and starboard sides;
a control console for operating the boat; and
a transverse ballast tank oriented transversely in the boat, the transverse ballast tank including:
  (a) a port-side portion located on the port side of a longitudinal centerline of the boat;
  (b) a starboard-side portion located on the starboard side of the boat's longitudinal centerline; and
  (c) a center portion connecting the port-side portion to the starboard-side portion such that water in the transverse ballast tank can flow between the port-side portion and the starboard-side portion, wherein a flow passage from the center portion to the port-side portion is located in the bottom half of the port-side portion, and a flow passage from the center portion to the starboard-side portion is located in the bottom half of the starboard-side portion.

30. The boat of claim 29, wherein the entirety of the transverse ballast tank is located in the aft half of the boat.

31. The boat of claim 29, wherein the center portion is configured to hold water, and a majority of the center portion is at a lower level in the boat than a majority of each of the port-side portion and the starboard-side portion when the boat is evenly keeled.

32. The boat of claim 29, wherein the port-side portion of the transverse ballast tank is located within an outboard third of the boat on the port side of the boat's longitudinal centerline, and the starboard-side portion of the transverse ballast tank is located within an outboard third of the boat on the starboard side of the boat's longitudinal centerline.

33. The boat of claim 29, wherein the transverse ballast tank has a width spanning from a position proximate the port side of the hull to a position proximate the starboard side of the hull.

34. The boat of claim 29, further comprising a pair of trim devices attached to the aft half of the hull, a first one of the trim devices being positioned on a port side of the boat's longitudinal centerline, and second one of the trim devices being positioned on a starboard side of the boat's longitudinal centerline, each of the trim devices being moveable between a deployed position and a non-deployed position.

35. The boat of claim 34, wherein the trim devices are trim tabs or interceptors.

36. The boat of claim 34, wherein each trim device includes a pivot axis that is horizontal or inclined no more than about 35° from horizontal.

37. The boat of claim 36, wherein each trim device further includes at least one of (i) a downturned surface provided at a trailing portion of the trim device and (ii) a fin provided on a bottom surface of the trim device.

38. The boat of claim 36, wherein each trim device is pivotally attached to the transom of the boat.

39. The boat of claim 29, further comprising a port ballast tank and a starboard ballast tank.

40. The boat of claim 39, wherein at least a portion of the port-side portion of the transverse ballast tank is located directly above the port ballast tank and at least a portion of the starboard-side portion of the transverse ballast tank is located directly above the starboard ballast tank.

41. The boat of claim 39, wherein the center portion of the transverse ballast tank is located between the port ballast tank and the starboard ballast tank.

42. The boat of claim 29, wherein the flow passage from the center portion to the port-side portion is located in the upper half of the center portion, and a flow passage from the center portion to the starboard-side portion is located in the upper half of the center portion.

* * * * *